United States Patent [19]
Ito et al.

[11] Patent Number: 5,309,362
[45] Date of Patent: May 3, 1994

[54] ENGINE TORQUE CONTROLLING DEVICE RESPONSIVE TO THE ACCELERATION OF THE VEHICLE AND SLIPPAGE OF THE WHEELS

[75] Inventors: Masayoshi Ito, Okazaki; Masayuki Hashiguchi, Oobu, both of Japan

[73] Assignee: Mitsubishi Jidosha Kogyo Kabushiki Kaisha, Japan

[21] Appl. No.: 1,909

[22] Filed: Jan. 8, 1993

Related U.S. Application Data

[63] Continuation of Ser. No. 644,374, Jan. 23, 1991, abandoned.

[30] Foreign Application Priority Data

Jan. 25, 1990 [JP] Japan .................................. 2-13553
Jan. 30, 1990 [JP] Japan .................................. 2-17821
May 16, 1990 [JP] Japan .................................. 2-124293

[51] Int. Cl.⁵ ............................................. B60K 28/16
[52] U.S. Cl. .............................. 364/426.03; 180/197; 180/282
[58] Field of Search .................. 364/424.05, 426.01, 364/426.02, 426.03; 180/197, 282

[56] References Cited

U.S. PATENT DOCUMENTS

| | | | |
|---|---|---|---|
| 4,637,487 | 1/1987 | Nakamura et al. | 180/197 |
| 4,763,262 | 8/1988 | Leiber | 364/426.03 |
| 4,933,856 | 6/1990 | Leiber | 364/426.01 |
| 4,933,857 | 6/1990 | Hashiguchi et al. | 364/426.02 |
| 4,946,015 | 8/1990 | Browalski et al. | 364/426.03 X |
| 4,985,838 | 1/1991 | Hashiguchi et al. | 364/426.02 |
| 5,041,978 | 8/1991 | Nakayama et al. | 364/426.03 |
| 5,051,908 | 9/1991 | Shiraishi | 364/426.02 |

FOREIGN PATENT DOCUMENTS 0325290 1/1989 European Pat. Off. .
2066538 7/1981 United Kingdom .
2213289 12/1988 United Kingdom .

Primary Examiner—Thomas G. Black
Assistant Examiner—Collin W. Park
Attorney, Agent, or Firm—Wegner, Cantor, Mueller & Player

[57] ABSTRACT

A driving torque controlling system by which a vehicle can drive with safety and certainty while maintaining an appropriate posture without dissatisfying the will of a driver very much. The driving torque controlling system comprises a control signal selecting section which selects, in response to a predetermined change-over condition, one of control signals from a turning control unit for setting an aimed driving torque in response to a magnitude of lateral acceleration applied to the vehicle during turning of the vehicle and a slip control unit for setting an aimed driving torque in response to an amount of slip of a driving wheel of the vehicle. A torque controlling unit receives a selected control signal from the control signal selecting means and reduces the driving torque of the vehicle in response to the received control signal independently of operation by a driver of the vehicle.

7 Claims, 21 Drawing Sheets

ENGINE TORQUE CONTROLLING DEVICE RESPONSIVE TO THE ACCELERATION OF THE VEHICLE AND SLIPPAGE OF THE WHEELS

This application is a continuation of U.S. application Ser. No. 07/644,374 filed Jan. 23, 1991, now abandoned.

BACKGROUND OF THE INVENTION

1. Field of the Invention

This invention relates to a driving torque controlling system for a vehicle wherein driving torque of an engine is reduced rapidly in response to a magnitude of lateral acceleration which may be produced upon turning of the vehicle or to an amount of slip of a driving wheel upon acceleration of the vehicle in order to assure safe running of the vehicle.

2. Description of Background Art

When the condition of a road on which a vehicle is driving varies suddenly or when a vehicle is driving on a slippery road having a low coefficient of friction such as, for example, a snowy road or a frozen road, it frequently occurs that a driving wheel of the vehicle rotates slipping or in vain.

In such an instance, it is very difficult even for a skilled driver to adjust the amount of operation of an accelerator pedal to control the output power of an engine skillfully so that the driving wheel may not rotate slipping or in vain.

Similarly, a vehicle which is driving on a curved road is acted upon by centrifugal force corresponding to lateral acceleration of a direction perpendicular to the driving direction. Accordingly, when the driving speed of the vehicle on the curved road is excessively high, it may exceed a limit of gripping force of a tire to cause lateral slipping of the body of the vehicle.

In such an instance, in order to reduce the output power of the engine appropriately so that the vehicle can drive with safety with a turning radius corresponding to the curved road, particularly when no exit of the curved road can be found out or where the radius of curvature of the curved road decreases gradually, a very high driving technique is required.

With conventional vehicles having a so-called understeering tendency, it is necessary to gradually increase the steering amount in accordance with an increase of lateral acceleration acting upon the vehicle. However, if such lateral acceleration exceeds a particular value peculiar to the vehicle, then the steering amount increases suddenly, which makes desired turning driving difficult. It is well known that such tendency is prominent particularly with vehicles of the front engine front drive type which have a strong understeering tendency.

From such circumstances, several improved driving torque controlling systems have been proposed, and in an exemplary one of such systems, a slipping condition of a driving wheel is detected and, if a slip of the driving wheel takes place, the output power of the engine is reduced compulsorily independently of an amount of operation of the accelerator pedal by the driver. In another exemplary one of the improved driving torque controlling systems, lateral acceleration of the vehicle is detected and, before a turning limit across which it is difficult for the vehicle to turn is reached, the output power of the engine is reduced compulsorily independently of an amount of operation of the accelerator pedal by the driver. Due to such driving torque controlling systems, the driver can select, when it is considered necessary, one of driving of the vehicle in which the driving torque controlling system is used and normal driving in which the output power of the engine is controlled in response to an amount of operation of the accelerator pedal.

In one of such vehicle driving torque controlling systems, a rotational speed of a driving wheel and another rotational speed of a driven wheel are detected and, considering a difference between the rotational speeds as an amount of slip of the driving wheel, the driving torque of the engine is controlled in response to such slip amount. Another vehicle driving torque controlling system controls the driving torque of the engine in response to an amount of yawing (hereinafter referred to as yaw rate) or the like of the vehicle.

In the case of the latter means, since yawing and so forth of the vehicle which are produced mainly during high speed quick turning of the vehicle have a tendency that the amounts thereof increase suddenly as the speed of the vehicle increases and the turning motion of the vehicle becomes quick, a yaw rate is detected by means of a vibration sensor, an acceleration sensor or the like, and the driving torque of the engine is reduced when the yaw rate exceeds a predetermined level.

Where such driving torque controlling system is employed, it is also possible to reduce a shock and so forth during a gear shifting operation of an automatic transmission.

When the driving safety of a vehicle is considered, it is desirable for the vehicle to include thereon a driving torque controlling system which detects a slipping condition of a driving wheel and compulsorily reduces, when a slipping condition of the driving wheel takes place, the output power of the engine independently of an amount of operation of the accelerator pedal by a driver and another controlling system which detects lateral acceleration of the vehicle and compulsorily reduces, before it becomes difficult or impossible for the vehicle to turn, the output power of the engine independently of an amount of operation of the accelerator pedal by the driver.

However, no conventional vehicles include both of an output controlling system which compulsorily reduces, when a slipping condition of a driving wheel takes place, the output power of the engine independently of an amount of operation of the accelerator pedal by the driver and another output controlling system which compulsorily reduces, before it becomes difficult or impossible for the vehicle to turn, the output power of the engine independently of an amount of operation of the accelerator pedal by the driver. Accordingly, in case a slip of a driving wheel takes place and simultaneously the vehicle is likely to become difficult to turn, it is a problem how much the driving torque of the engine should be reduced in order to permit the vehicle to keep its posture properly and drive with safety and certainty without failing to satisfy the intention of the driver much.

SUMMARY OF THE INVENTION

It is an object of the present invention to provide a driving torque controlling system for a vehicle by which the vehicle can drive with safety and certainty while maintaining an appropriate posture without dissatisfying the will of a driver very much.

In order to attain the object, according to the present invention, there is provided a driving torque controlling system for a vehicle of the type which includes torque controlling means for reducing the driving torque independently of operation by a driver, a turning control unit for setting an aimed driving torque in response to a magnitude of lateral acceleration applied to the vehicle during turning of the vehicle and developing a control signal for controlling operation of the torque controlling means so that the driving torque of the vehicle may be equal to the aimed driving torque thus set, and a slip control unit for setting an aimed driving torque in response to an amount of slip of a driving wheel of the vehicle and developing a control signal for controlling operation of the torque controlling means so that the driving torque of the vehicle may be equal to the aimed driving torque thus set, the driving torque controlling system comprising control signal selecting means for selecting one of the control signal from the turning control unit and the control signal from the slip control unit in response to a predetermined change-over condition and outputting the control signal thus selected to the torque controlling means.

Preferably, the turning control unit includes aimed lateral acceleration setting means for setting an aimed lateral acceleration in response to a steering angle and a speed of the vehicle, aimed advancing direction acceleration setting means for setting an aimed advancing direction acceleration corresponding to the aimed lateral acceleration set by the aimed lateral acceleration setting means, and aimed driving torque setting means for setting an aimed driving torque in response to the aimed advancing direction acceleration set by the aimed advancing direction acceleration setting means.

Meanwhile, the slip control unit preferably includes reference driving torque setting means for setting a reference driving torque in response to an acceleration of the vehicle, and aimed driving torque setting means for correcting the reference driving torque set by the reference driving torque setting means with a correction torque based on a slip of the driving wheel to set an aimed driving torque.

In this instance, the control signal selecting means is preferably constituted such that it selects a smaller one of the aimed driving torque set by the turning control unit and the aimed driving torque set by the slip control unit and outputs the thus selected aimed driving torque to the torque selecting means.

Further, the control signal selecting means is preferably constituted such that it selects, when the turning control unit sets a pair of aimed driving torques for turning control for a low μ road and for a high μ road, a smallest one of the two aimed driving torques from the turning control unit and the aimed driving torque from the slip control unit as an aimed torque.

Meanwhile, the control signal selecting means is preferably constituted such that it selects, during slip control, the aimed torque from the slip control unit.

In this instance, the control signal selecting means preferably selects, when the turning control unit sets a pair of aimed driving torques for turning control for a low μ road and for a high μ road, the aimed driving torque from the slip control unit, the aimed driving torque for turning control for a low μ road and the aimed driving torque for turning control for a high μ road from the turning control unit in this order.

With the driving torque controlling system for a vehicle, in order that a minimum aimed driving torque may be selected as a driving torque of an engine taking the driving safety of the vehicle into consideration, when the slip control unit functions effectively, the aimed driving torque is either set in response to an amount of slip of the driving wheel of the vehicle or selected from among such aimed driving torque corresponding to an amount of slip of the driving wheel of the vehicle, an aimed driving torque for a road having a low coefficient of friction and an aimed driving torque for another road having a high coefficient of friction in this order. Accordingly, the vehicle can drive with safety and certainty while maintaining an appropriate posture without dissatisfying the will of the driver very much.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENT

Figure 1:
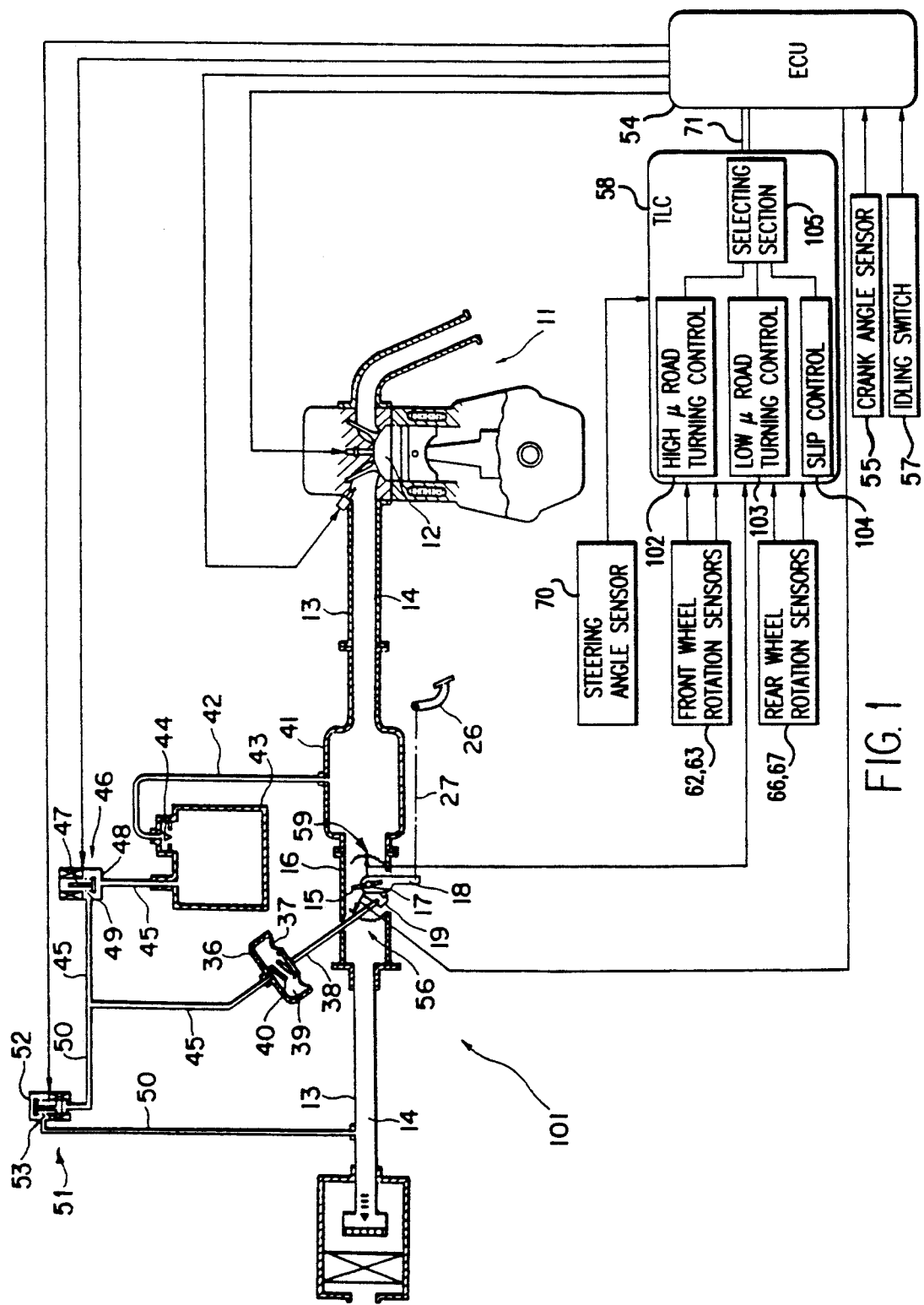
FIG. 1 is a diagrammatic representation of a driving torque controlling system for an engine showing a preferred embodiment of the present invention.
Figure 2:
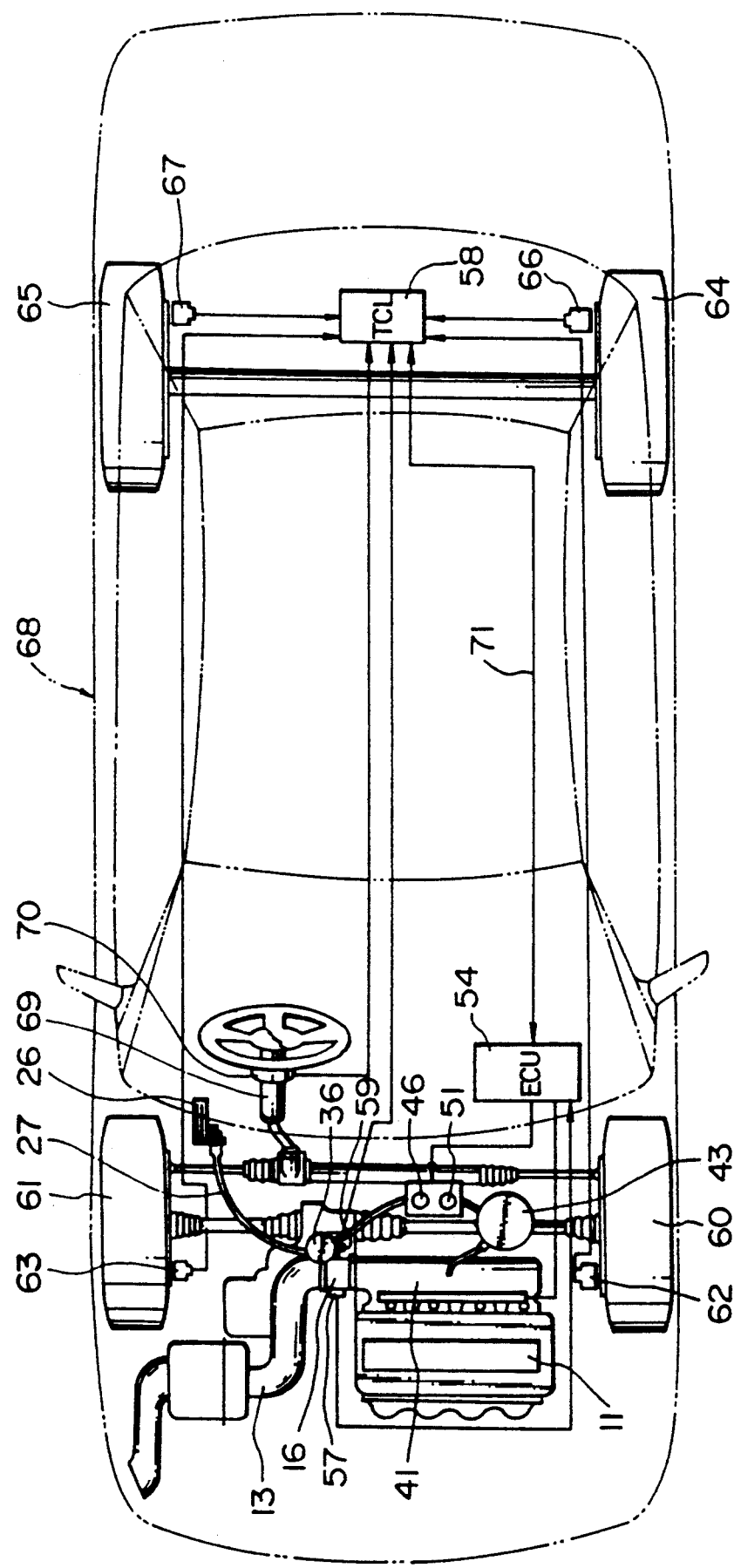
FIG. 2 is a diagrammatic view schematically showing an automobile in which the driving torque controlling system of FIG. 1 is incorporated.
Figure 3:
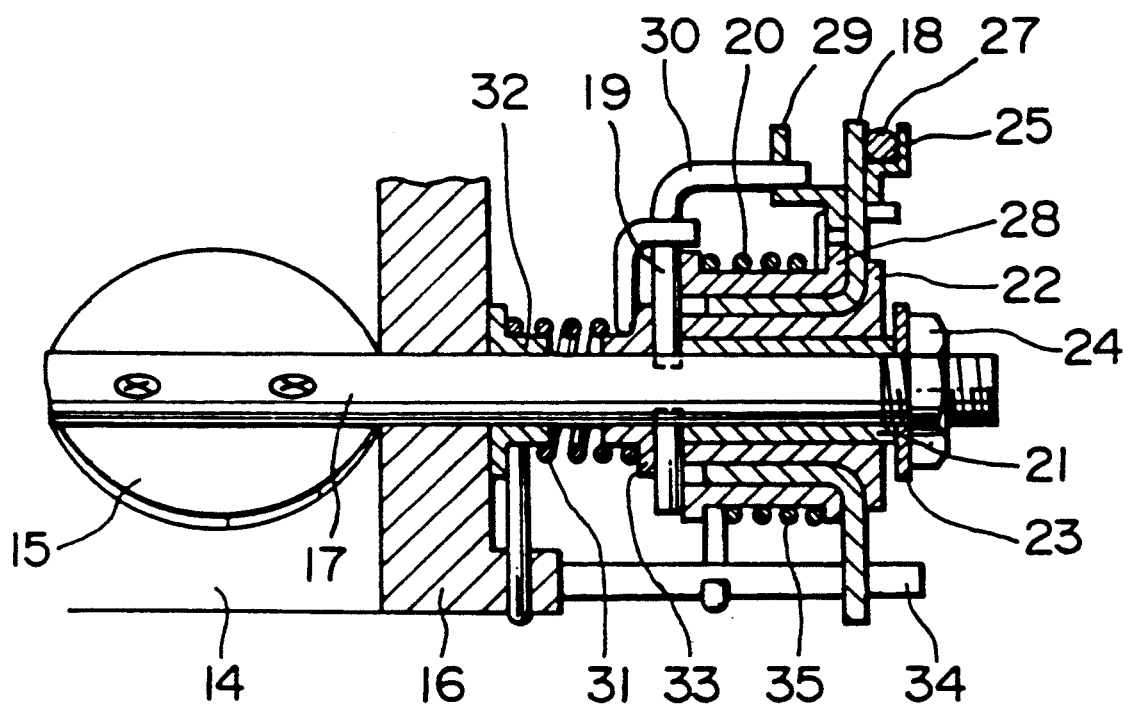
FIG. 3 is a sectional view showing an actuating mechanism for a throttle valve of the automobile shown in FIG. 2.

Referring first to FIGS. 1 and 2, there is shown a driving torque controlling system according to the present invention which is incorporated in a vehicle of the front wheel driving type. The vehicle includes an intake pipe 13 connected to a combustion chamber 12 of an engine 11, and a throttle body 16 interposed intermediately in the intake pipe 13 for varying the opening of an intake air passageway 14 formed by the intake pipe 13 to adjust an amount of intake air to be supplied into the combustion chamber 12. As seen in FIG. 1 and also in FIG. 3 which shows an enlarged section of a portion of the throttle body 16 having a tubular shape, a throttle shaft 17 to which a throttle valve 15 is secured integrally is supported at the opposite ends thereof for pivotal motion on the throttle body 16. An accelerator lever 18 and a throttle lever 19 are fitted coaxially at an end portion of the throttle shaft 17 which extends into the intake air passageway 14.

A bush 21 and a spacer 22 are interposed between the throttle shaft 17 and a tubular portion of the accelerator lever 18 so that the accelerator lever 18 may be mounted for pivotal motion around the throttle shaft 17. A washer 23 and a nut 24 are mounted at an end portion of the throttle shaft 17 and prevent the accelerator lever 18 from coming off the throttle shaft 17. An accelerator pedal 26 to be operated by a driver is connected by way of a cable 27 to a cable receiver 25 integrated with the accelerator lever 18 so that the accelerator lever 18 may be pivoted around the throttle shaft 17 in response to an amount of operation of the accelerator pedal 26.

The throttle lever 19 is integrally secured to the throttle shaft 17 so that, when the throttle lever 19 is operated, the throttle valve 15 may be pivoted together with the throttle shaft 17. A collar 28 is fitted coaxially and integrally on the tubular portion 20 of the accelerator lever 18, and a stopper 30 is formed at an end portion of the throttle lever 19 for engaging with a pawl portion 29 formed on the collar 28. The pawl portion 29 and stopper 30 are set in such a positional relationship that they are engaged with each other when the throttle lever 19 is pivoted in a direction in which the throttle valve 15 is opened or when the accelerator lever 18 is pivoted in a direction in which the throttle valve 15 is closed.

A torsion coil spring 31 is mounted coaxially around the throttle shaft 17 between the throttle body 16 and throttle lever 19 and is fitted at the opposite end portions thereof around a pair of tubular spring receivers 32 and 33 fitted on the throttle shaft 17. The torsion coil spring 13 normally biases the throttle lever 19 in a direction in which the stopper 30 of the throttle lever 19 is resiliently pressed against the pawl portion 29 of the accelerator pedal 18 to open the throttle valve 15. Another torsion coil spring 35 is mounted coaxially with the throttle shaft 17 around the tubular portion 20 of the accelerator lever 18 and has an end anchored at the accelerator lever 18 by way of the collar 28 and the other end anchored at a stopper pin 34 which extends from the throttle body 16. The torsion coil spring 35 normally biases the accelerator lever 18 in a direction in which the pawl portion 29 of the accelerator lever 18 is resiliently pressed against the stopper 30 of the throttle lever 19 to close the throttle valve 15 thereby to provide a detent feeling to the accelerator pedal 26.

A control bar 38 is secured at a base end thereof to a diaphragm 37 of an actuator 36 and connected at the other end thereof to an end of the throttle lever 19. A compression coil spring 40 is installed in a pressure chamber 39 formed in the actuator 36 and normally biases, together with the torsion coil spring 31, the throttle lever 19 in the direction in which the stopper 30 of the throttle lever 19 is resiliently pressed against the pawl portion 29 of the accelerator lever 18 to open the throttle valve 15. The biasing force of the torsion coil spring 35 is set greater than a sum of the biasing forces of the two springs 31 and 40. Consequently, the throttle valve 15 is not opened unless the accelerator pedal 26 is operated or the internal pressure of the pressure chamber 39 is reduced to a negative pressure which is greater than the sum of the biasing forces of the two springs 31 and 40.

A surge tank 41 is connected to the downstream side of the throttle body 16 and forms part of the intake air passageway 14. A vacuum tank 43 is communicated with the surge tank 41 by way of a connecting pipe 42, and a check valve 44 is interposed between the vacuum take 43 and connecting pipe 42 for permitting only movement of air from the vacuum tank 43 into the surge tank 41. Thus, the internal pressure of the vacuum tank 43 is set to a negative pressure substantially equal to a minimum internal pressure of the surge tank 41.

The vacuum tank 43 and the pressure chamber 39 of the actuator 36 are communicated with each other by way of a pipe 45, and a first torque controlling solenoid valve 46 of the type which presents a closing condition when it is not energized is interposed intermediately in the pipe 45. A spring 49 is incorporated in the torque controlling solenoid valve 46 and normally biases a plunger 47 to a valve seat 48 to close the pipe 45.

A pipe 50 is connected to the pipe 45 between the first torque controlling solenoid valve 46 and actuator 36 and communicates with a portion of the intake air passageway 14 on the upstream side of the throttle valve 15. A second torque controlling solenoid valve 51 of the type which presents an opening condition when it is not energized is interposed intermediately in the pipe 50. A spring 53 is installed in the torque controlling solenoid valve 51 and normally biases a plunger 52 to open the pipe 50.

An electronic control unit (hereinafter referred to as ECU) 54 for controlling an operating condition of the engine 11 is connected to the two torque controlling solenoid valves 46 and 51 so that energization of the torque controlling solenoid valves 46 and 51 may be duty controlled in accordance with an instruction from the ECU 54. In the present embodiment, the two torque controlling solenoid valves 46 and 51 and ECU 54 generally constitute torque controlling means 101.

When the duty ratio of the torque controlling solenoid valves 46 and 51 is, for example, zero percent, the pressure chamber 39 of the actuator 36 presents an atmospheric pressure substantially equal to the internal pressure of the intake air passageway 14 on the upstream side of the throttle valve 15, and consequently, the opening of the throttle valve 15 corresponds one by one to the amount of operation of the accelerator pedal 26. On the contrary, when the duty ratio of the torque controlling solenoid valves 46 and 51 is 100 percent, the pressure chamber 39 of the actuator 36 presents a negative pressure substantially equal to the internal pressure of the vacuum tank 43, and consequently, the control bar 38 is pulled up obliquely leftwardly in FIG. 1. As a result, the throttle valve 15 is closed independently of an amount of operation of the accelerator pedal 26, and the driving torque of the engine 11 presents a compulsorily reduced condition. By adjusting the duty ratio of the torque controlling solenoid valves 46 and 51 in this manner, the opening of the throttle valve 15 can be varied to arbitrarily adjust the driving torque of the engine 11 independently of an amount of operation of the accelerator pedal 26.

Connected to the ECU 54 are a crank angle sensor 55 attached to the engine 11 for detecting an engine rotational speed, a throttle opening sensor 56 attached to the throttle body 16 for detecting an opening of the throttle lever 19, and an idling switch 57 for detecting a fully closed condition of the throttle valve 15. Output signals of the crank angle sensor 55, throttle opening sensor 56 and idling switch 57 are thus sent to the ECU 54.

A torque calculating unit (hereinafter referred to as TCL) 58 is also provided for calculating an aimed driving torque of the engine 11. The TCL 58 is connected to receive output signals from an accelerator opening sensor 59 attached to the throttle body 16 together with the throttle opening sensor 56 and idling switch 57 for detecting an opening of the accelerator lever 18, a pair of front wheel rotation sensors 62 and 63 for detecting rotational speeds of a pair of left and right front wheels 60 and 61, respectively, of the vehicle which serve as driving wheels, a pair of rear wheel rotation sensors 66 and 67 for detecting rotational speeds of a pair of left and right rear wheels 64 and 65, respectively, of the vehicle which serve as driven wheels, and a steering angle sensor 70 for detecting a turning angle of a steering shaft 69 when the vehicle 58 turns with reference to a straightforwardly advancing condition.

The ECU 54 and TCL 58 are interconnected by way of a communication cable 71, and information of an operating condition of the engine 11 such as an intake air amount is sent from the ECU 54 to the TCL 58 in addition to an engine rotational speed and a detection signal from the idling switch 57. To the contrary, information regarding an aimed driving torque calculated by the TCL 58 is sent from the TCL 58 to the ECU 54.

The TCL 58 includes a slip control unit 104 which calculates an aimed driving torque $T_{OS}$ of the engine 11 when slip control is to be executed and outputs a signal representative of such calculated aimed driving torque $T_{OS}$, a turning control unit 102 which calculates an aimed driving torque $T_{OH}$ of the engine 11 when turning control is to be executed on a road having a comparatively high coefficient of friction such as a dry road (such road will be hereinafter referred to as high $\mu$ road) and outputs a signal representative of the calculated aimed driving torque $T_{OH}$, and another turning control unit 103 which calculates an aimed driving torque $T_{OL}$ of the engine 11 when turning control is to be executed on a road having a comparatively low coefficient of friction such as a frozen road or a suddy road (such road will be hereinafter referred to as low $\mu$ road) and outputs a signal representative of the calculated aimed driving torque $T_{OL}$. Calculations proceed always in parallel relationship in the control units 104, 102 and 103.

The TCL 58 further includes a control signal selecting section 105 for selecting an optimum final aimed driving torque $T_O$ from among those aimed driving torques $T_{OS}$, $T_{OH}$ and $T_{OL}$ and outputting the thus selected optimum final aimed driving torque $T_O$ to the ECU 54.

Though not particularly shown, the turning control unit 102 includes a section serving as aimed lateral acceleration setting means for calculating an aimed lateral acceleration in accordance with a steering angle and a car speed, another section serving as aimed longitudinal acceleration setting means for setting an aimed longitudinal acceleration in response to such aimed lateral acceleration, and a further section serving as aimed driving torque setting means for setting an aimed driving torque in response to the aimed longitudinal acceleration. Meanwhile, the slip control unit 103 includes a section serving as reference driving torque setting means for calculating a reference driving torque in accordance with an acceleration of the vehicle, and another section serving as aimed driving torque setting means for correcting such reference driving torque to set an aimed driving torque.

Figure 4:
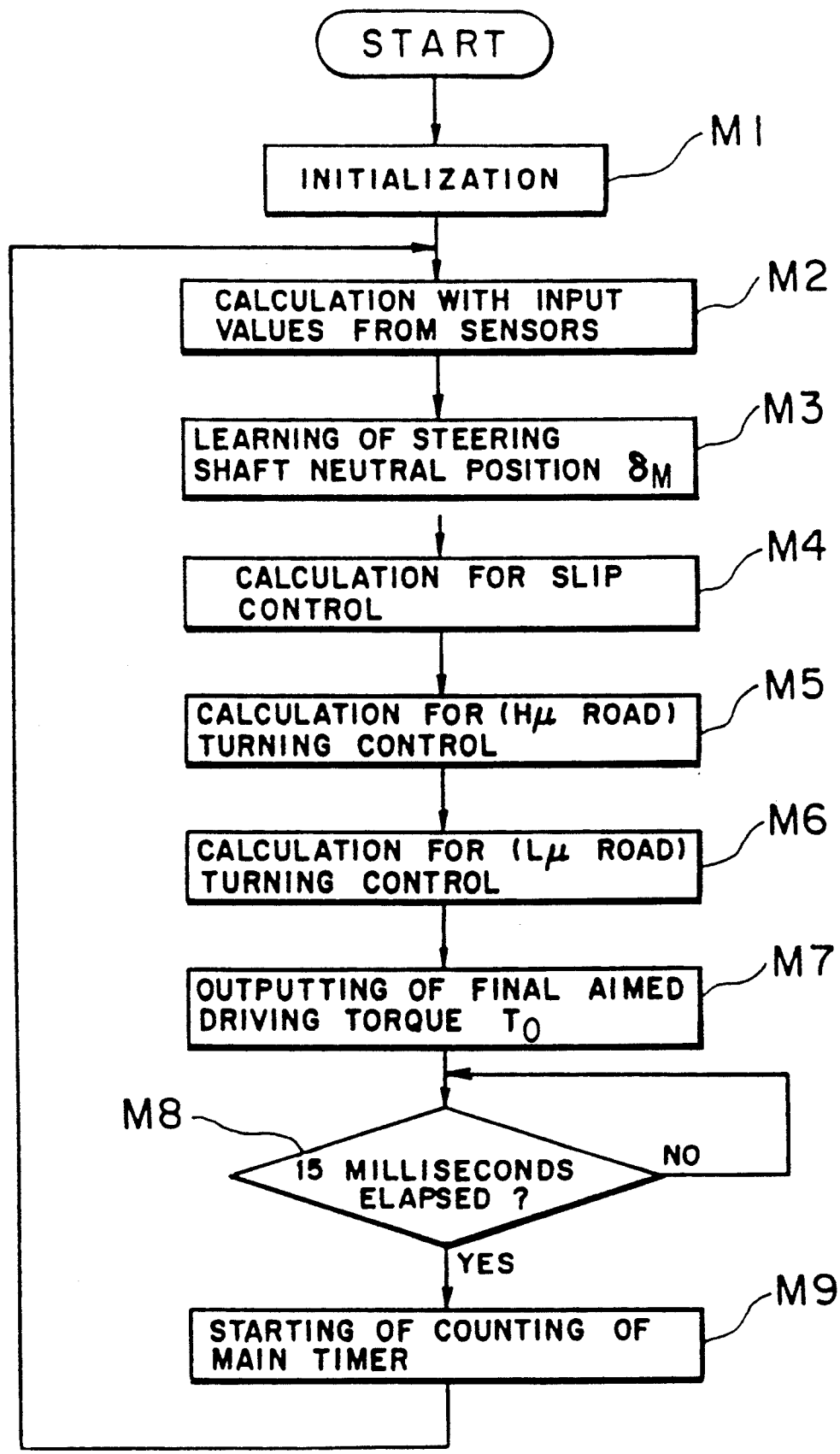
FIG. 4 is a flow chart illustrating a general flow of operations of the driving torque controlling system of FIG. 1.

An outline of a flow of control with the driving torque controlling apparatus of the embodiment described above is illustrated in FIG. 4. Referring to FIG. 4, in the embodiment shown, such aimed driving torques $T_{OS}$, $T_{OH}$ and $T_{OL}$ of the engine 11 as described above are successively calculated in a parallel relationship by the TCL 58, and one of such three aimed driving torques $T_{OS}$, $T_{OH}$ and $T_{OL}$ is selected as an optimum final aimed driving torque $T_O$ so that the driving torque 11 may be reduced in accordance with the necessity.

In particular, the control program of FIG. 4 is started in response to an operation of an ignition key not shown of the vehicle to switch on, and first at step M1 after the control is entered, an initial value $\delta_m(a)$ of the turning position of the steering shaft 69 is read in and initialization of the system is executed including resetting of various flags and starting of counting operation of a main timer which counts for each 15 milliseconds which make a sampling period of the present control.

Then at step M2, the TCL 58 executes necessary calculations of a car speed V and so forth in accordance with detection signals received from the various sensors. Then at step M3, a neutral position $\delta_M$ of the steering shaft 69 is learned and corrected. The neutral position $\delta_M$ of the steering shaft 69 of the vehicle 68 is read in as its initial value $\delta_{m(0)}$ each time the ignition key is operated to be switched on, and the initial value $\delta_{m(0)}$ is learned and corrected only when the vehicle 68 satisfies straightforward advancement conditions which will be hereinafter described until the ignition key is operated to be switch off.

Subsequently at step M4, the TCL 58 calculates, in accordance with a difference in rotational speed between the front wheels 60 and 61 and the rear wheels 64 and 65, an aimed driving torque $T_{OS}$ for use when slip control is to be executed to control the driving torque of the engine 11. Then at step M5, another aimed torque $T_{OH}$ of the engine 11 for use when turning control is to be executed on a high μ road (Hμ road) is calculated, whereafter a further aimed driving torque $T_{OL}$ of the engine 11 for use when turning control is to be executed on a low μ road (Lμ road) is calculated at step M6.

Then at step M7, the control signal selecting section 104 of the TCL 58 selects one of the aimed driving torques $T_{OS}$, $T_{OH}$ and $T_{OL}$ as an optimum final aimed driving torque $T_O$ in accordance with a method which will be hereinafter described and the ECU 54 controls the duty ratio of the pair of torque controlling solenoid valves 46 and 51 so that the driving torque of the engine 11 may be equal to the thus selected final aimed driving torque $T_O$ thereby to cause the vehicle 68 to drive reasonably with safety.

The driving torque of the engine 11 is controlled in this manner until counting down of the main timer to zero is completed, that is, until the period of 15 milliseconds is elapsed, at step M8. After then, counting down operation of the main timer is resumed at step M9, and after then, the steps of operation from M2 to M9 are repeated until the ignition key is operated to be turned off.

The reason why the neutral position $\delta_M$ of the steering shaft 69 is learned and corrected at step M3 is that a displacement sometimes occurs between a turning amount of the steering shaft 69 and an actual steering angle δ of the front wheels 60 and 61 serving as steering wheels and varies the neutral position $\delta_M$ of the steering shaft 69 when toe-in adjustment of the front wheels 60 and 61 is performed for the maintenance and repair of the vehicle 68 or due to aging such as abrasion of a steering gear wheel not shown.

Figure 5:
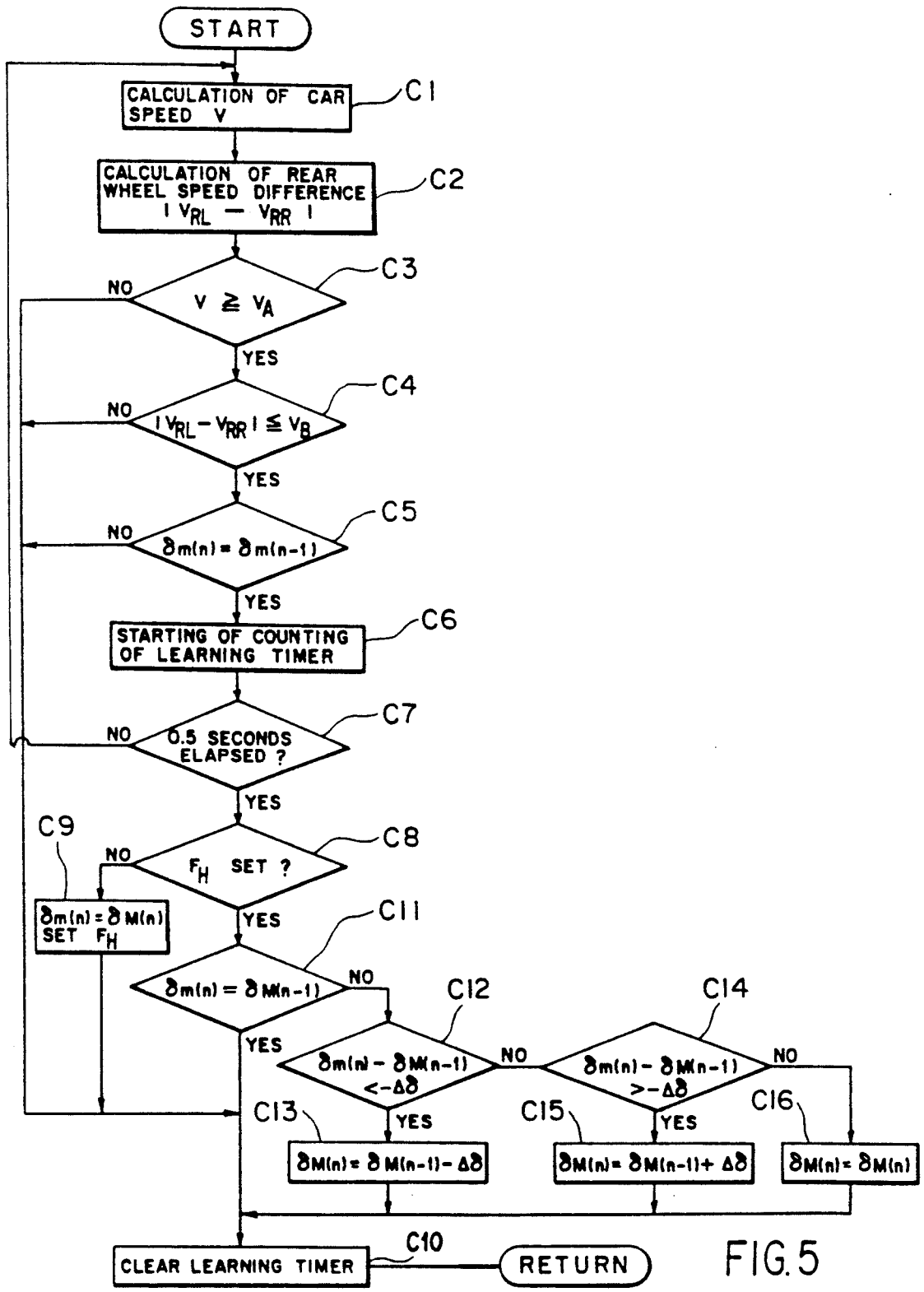
FIG. 5 is a flow chart illustrating a detailed flow of neutral position learning and correcting control for a steering shaft in the flow chart of FIG. 4.

A detailed procedure of learning and correcting the neutral position $\delta_M$ of the steering shaft 69 is illustrated in FIG. 5. Referring to FIG. 5, the TCL 58 calculates, at step C1, a car speed V from detection signals from the rear wheel rotation sensors 66 and 67 in accordance with the following expression (1):

$$V = \frac{V_{RL} + V_{RR}}{2} \quad (1)$$

where $V_{RL}$ and $V_{RR}$ are circumferential speeds of the pair of left and right rear wheels 64 and 65, respectively.

Then at step C2, the TCL 58 calculates a difference between the circumferential speeds of the pair of left and right rear wheels 64 and 65, that is, $|V_{RL} - V_{RR}|$ (such difference will be hereinafter referred to as rear wheel speed difference).

After then, the TCL 58 judges at step C3 whether or not the car speed V is equal to or higher than a preset threshold value $V_A$. Such operation is required because a rear wheel speed difference $|V_{RL} - V_{RR}|$ or the like involved in steering cannot be detected unless the speed of the vehicle 68 rises to a certain degree, and the threshold value mentioned above is set suitably, for example, to 20 km per hour by experiments or the like in accordance with driving characteristics of the vehicle 68.

Then, in case it is judged at step C3 that the car speed V is equal to or higher than the threshold value $V_A$, the TCL 58 judges at step C4 whether or not the rear wheel speed difference $|V_{RL} - V_{RR}|$ is equal to or smaller than a preset threshold value $V_B$ such as, for example, 0.1 km per hour, that is, whether or not the vehicle 68 is in a straightforwardly advancing condition. Here, the reason whey the threshold value $V_B$ is not set to 0 km per hour is that, when the pneumatic pressures of the tires of the left and right rear wheels 64 and 65 are not equal to each other, the pair of left and right rear wheels 64 and 65 present different circumferential speeds $V_{RL}$ and $V_{RR}$ although the vehicle 68 is in a straightforwardly advancing condition.

If it is judged at step C4 that the rear wheel speed difference $|V_{RL} - V_{RR}|$ is equal to or smaller than the threshold value $V_B$, then the TCL 58 judges at subsequent step C5 whether or not a current steering shaft turning position $\delta_{m(n)}$ is equal to a preceding steering shaft turning position $\delta_{m(n-1)}$ detected by the steering angle sensor 64. In this instance, it is desirable that the resolution in detection of a turning angle of the steering shaft 69 by the steering angle sensor 70 is set, for example, to 5 degrees or so in order to eliminate or minimize a possible influence of inadvertent movement of a hand of the driver and so forth.

In case it is judged at step C5 that the current steering shaft turning position $\delta_{m(n)}$ is equal to the preceding steering shaft turning position $\delta_{m(n-1)}$, the TCL 58 determines that the vehicle 68 is currently in a straightforwardly advancing condition and counts up or increments, at step C6, the count value of a learning timer (not shown) built in the TCL 58 for counting a period of 0.5 seconds.

Subsequently at step C7, the TCL 58 judges whether or not the period of 0.5 seconds has elapsed after starting of the counting operation of the learning timer, that is, whether or not a straightforwardly advancing condition of the vehicle 68 has continued for 0.5 seconds. In this instance, at an initial stage of driving of the vehicle 68, the period of 0.5 seconds has not yet elapsed after starting of counting of the learning timer, and accordingly, the control sequence returns to step C1 to repeat the operations at steps C1 to C7.

Then, if it is judged at step C7 that the period of 0.5 seconds has elapsed after starting of counting of the learning timer, the TCL 58 judges at subsequent step C8 whether or not a steering angle neutral position learning completion flag $F_H$ is in a set state, or in other words, whether or not the current learning control cycle is the first control cycle.

If it is judged at step C8 that the steering angle neutral position learning completion signal $F_H$ is not in a set state, the TCL 58 determines, at step C9, the current steering shaft turning position $\delta_{m(n)}$ as a new neutral position $\delta_{M(n)}$ of the steering shaft 69, reads the same into a memory thereof, and then sets the steering angle neutral position learning completion flag $F_H$.

After the new neutral position $\delta_{M(n)}$ of the steering shaft 69 is set in this manner, a turning angle $\delta_H$ of the steering shaft 69 is calculated with reference to the thus set neutral position $\delta_{M(n)}$ of the steering shaft 69 while a count value of the learning timer is cleared at step C10 so that learning of a steering angle neutral position may be executed again.

In case it is judged at step C8 that the steering angle neutral position learning completion flag $F_H$ is in a set state, that is, current learning of a steering angle neutral position is learning for the second or third time or so, the TCL 58 judges at step C11 whether or not the current steering shaft turning position $\delta_{m(n)}$ is equal to a preceding neutral position $\delta_{M(n-1)}$ of the steering shaft 69, that is, $$\delta_{m(n)} = \delta_{M(n-1)}$$

Then, if it is judged that the current steering wheel turning position $\delta_{m(n)}$ is equal to the preceding neutral position $\delta_{M(n-1)}$ of the steering shaft 69, then the control sequence advances to step C10 to execute subsequent learning of a steering angle neutral position.

If it is judged at step C11 that the current steering shaft turning position $\delta_{m(n)}$ is not equal to the preceding neutral position $\delta_{M(n-1)}$ of the steering shaft 69 due to a play of a steering system or the like of the vehicle, then the current steering shaft turning position $\delta_{m(n)}$ is not yet determined as a new neutral position $\delta_{M(n)}$ of the steering shaft 69, but in case the absolute value of a difference between the current steering shaft turning position $\delta_{m(n)}$ and the preceding neutral position $\delta_{M(n-1)}$ of the steering shaft 69 is greater than a preset correction limit amount $\Delta\delta$, the correction limit amount $\Delta\delta$ is subtracted from or added to the preceding neutral position $\delta_{M(n-1)}$ of the steering shaft 69 to determine a new neutral position $\delta_{M(n-1)}$ of the steering shaft 69. The new neutral position $\delta_{M(n-1)}$ of the steering shaft 69 thus obtained is read into the memory of the TCL 58.

In short, the TCL 58 judges at C12 whether or not a value obtained by subtraction of the preceding neutral position $\delta_{M(n-1)}$ of the steering shaft 69 from the current steering shaft turning position $\delta_{m(n)}$ is smaller than a preset negative correction limit amount $-\Delta\delta$. Then, if it is judged at step C12 that the difference value calculated by such subtraction is smaller than the negative correction limit amount $-\Delta\delta$, then the new neutral position $\delta_{M(n)}$ of the steering shaft 69 is changed, at step C13, with the preceding neutral position $\delta_{M(n-1)}$ of the steering shaft 69 and the negative correction limit amount $-\Delta\delta$ to $$\delta_{M(n)} = \delta_{M(n-1)} - \Delta\delta$$

so that the learning correction amount for each control cycle may not unconditionally increase toward the negative side.

Consequently, even if an extraordinary detection signal is received from the steering angle sensor 70 by some causes, the neutral position $\delta_M$ of the steering shaft 69 does not vary suddenly, and accordingly, a countermeasure to such trouble can be taken rapidly.

On the other hand, in case it is judged at step C12 that the difference value is greater than the negative correction limit amount $-\Delta\delta$, it is judged subsequently at step C14 whether or not the difference value obtained by subtraction of the preceding neutral position $\delta_{M(n-1)}$ of the steering shaft 69 from the current steering shaft turning position $\delta_{M(n)}$ is greater than the positive correction limit amount $\Delta\delta$. Then, if it is judged at step C14 that the difference value is greater than the positive correction limit amount $\Delta\delta$, the new neutral position $\delta_{M(n)}$ of the steering shaft 69 is changed, at step C15, with the preceding neutral position $\delta_{M(n-1)}$ of the steering shaft 69 and the positive correction limit amount $\Delta\delta$ to $$\delta_{M(n)} = \delta_{M(n-1)} + \Delta\delta$$

so that the learning correction amount for each control cycle may not unconditionally increase toward the positive side.

Consequently, even if an extraordinary detection signal is developed from the steering angle sensor 70 by some causes, the neutral position $\delta_M$ of the steering shaft 69 will not change suddenly, and accordingly, a countermeasure to such trouble can be taken rapidly.

However in case it is judged at step C14 that the difference value is equal to or smaller than the positive correction limit amount $\Delta\delta$, the current steering shaft turning position $\delta_{m(n)}$ is determined as a new neutral position $\delta_{M(n)}$ and is read out as it is at step C16.

Figure 6:
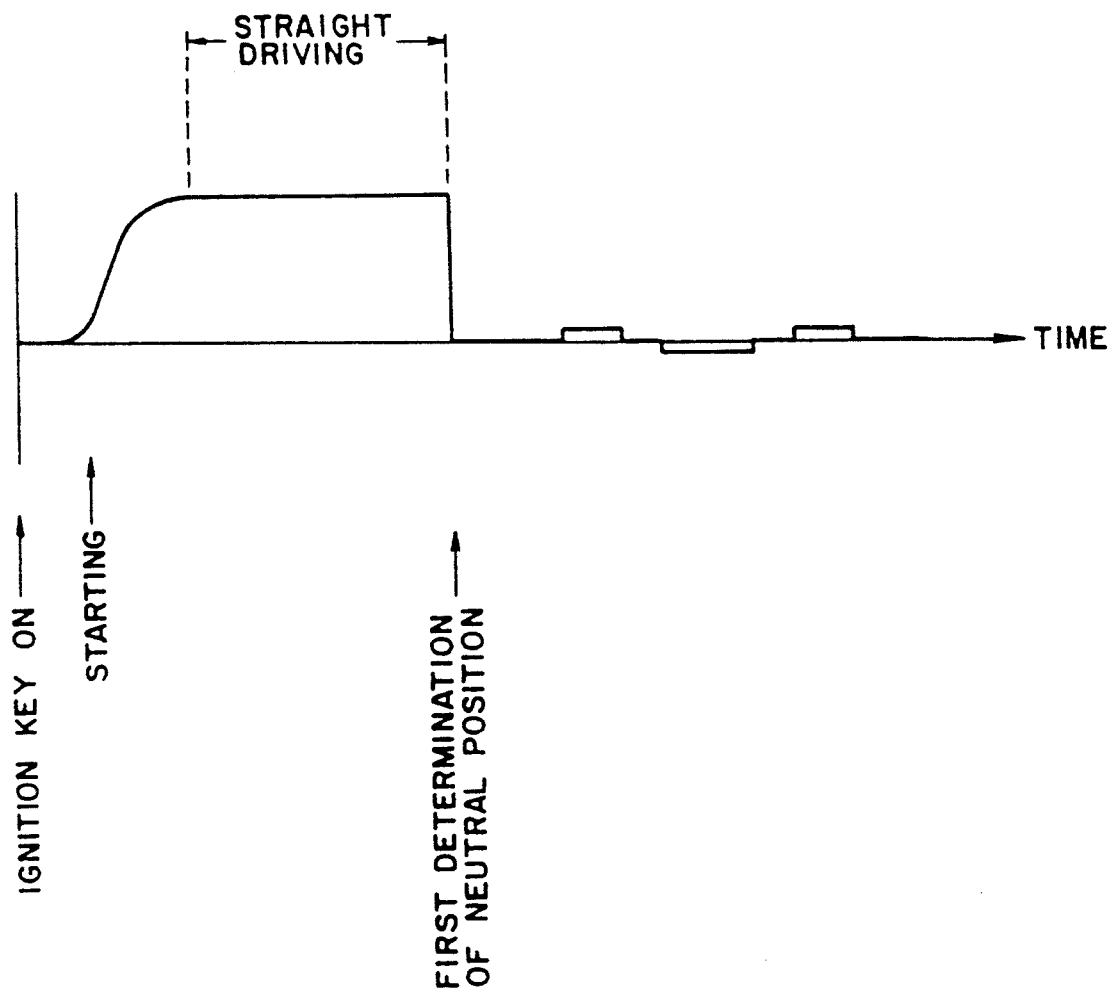
FIG. 6 is a graph illustrating a corrected condition of a learned value when a neutral position of the steering shaft is learned and corrected.

Accordingly, when the vehicle 68 starts with its front wheels 60 and 62 left in a turned condition, in case learning control of the neutral position $\delta_M$ of the steering shaft 69 is for the first time, the correction amount from the initial value $\delta_{m(0)}$ of the steering shaft turning position at step M1 described hereinabove is very great as seen in FIG. 6 which shows an example of varying condition of the neutral position $\delta_M$ of the steering shaft 69 in such instance, but the neutral position $\delta_M$ of the steering shaft 69 in the second or following learning control cycle is restricted by the operation at step C13 or C15.

After the neutral position $\delta_M$ of the steering shaft 69 is learned and corrected in this manner, an aimed driving torque $T_{OS}$ for use when slip control for restricting the driving torque of the engine 11 is to be executed is calculated in accordance with a car speed V and a difference between circumferential speeds $V_{FL}$ and $V_{FR}$ of the front wheels 60 and 61.

Figure 7:
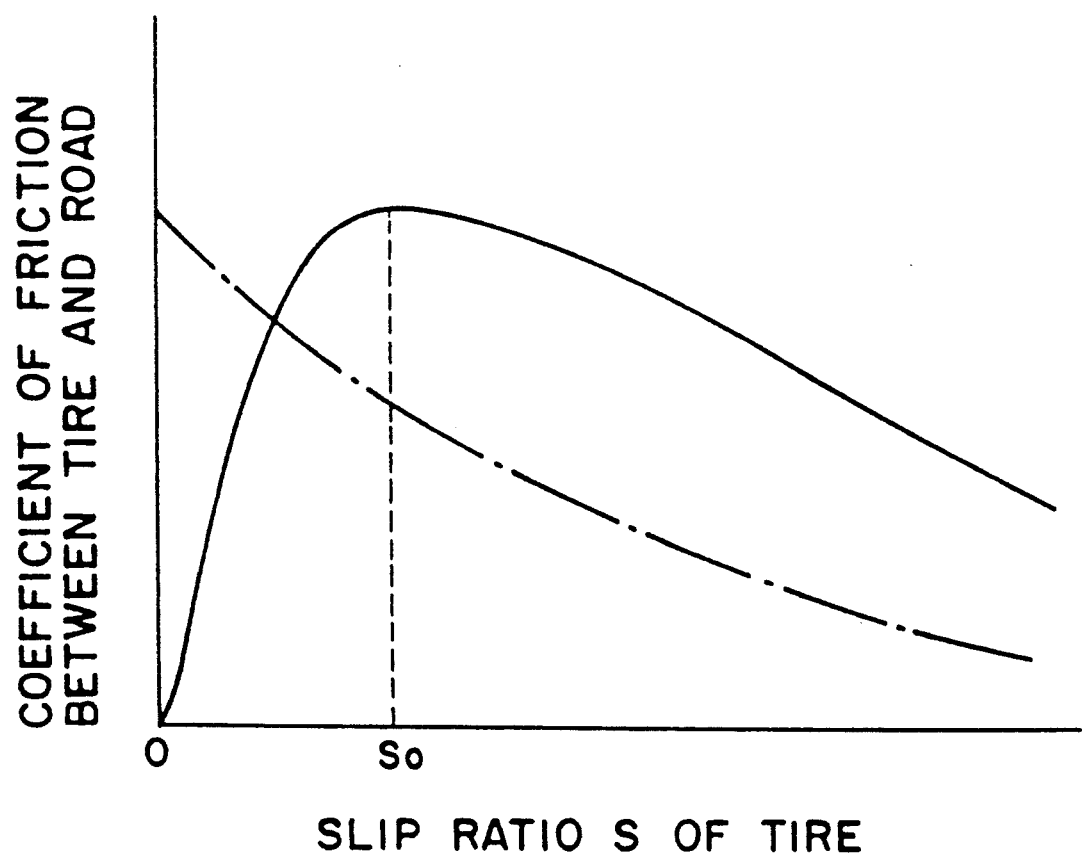
FIG. 7 is a graph illustrating a relationship between a coefficient of friction between a tire and a road and a slip ratio of the tire.

By the way, in order to cause a driving torque generated by the engine 11 to operate effectively, it is desirable to adjust the slip amount s of the front wheels 60 and 61 so that the slip ratio S of the tires of the front wheels 60 and 61 during driving may have a value, as seen in FIG. 7 which shows a relationship between a coefficient of friction between the tires and a road and a slip ratio of the tires, equal to or around an aimed slip ratio $S_O$ corresponding to a maximum value of a coefficient of friction between the tires and the road, thereby to prevent possible deterioration of the acceleration performance of the vehicle 68.

Here, the slip ratio S of the tires is given by $$S = \frac{\frac{V_{FL} + V_{FR}}{2} - V}{V}$$

and the aimed driving torque $T_{OS}$ of the engine 11 is set so that such slip ratio S may present a value equal to or around the aimed slip ratio $S_O$ corresponding to a maximum value of a coefficient of friction between the tires and the road. Such setting proceeds in accordance with the following calculation procedure.

First, the TCL 58 calculates, from a current car speed $V_{(n)}$ calculated in accordance with the expression (1) given hereinabove and another car speed $V_{(n-1)}$ calculated by a calculation in the preceding control cycle, a current advancing direction acceleration $G_X$ of the vehicle 68 in accordance with the following expression:

$$G_X = \frac{V_{(n)} - V_{(n-1)}}{3.6 \cdot \Delta t \cdot g}$$

where Δt is 15 milliseconds which is the sampling period of the main timer, and g is the gravitational acceleration.

Figure 8:
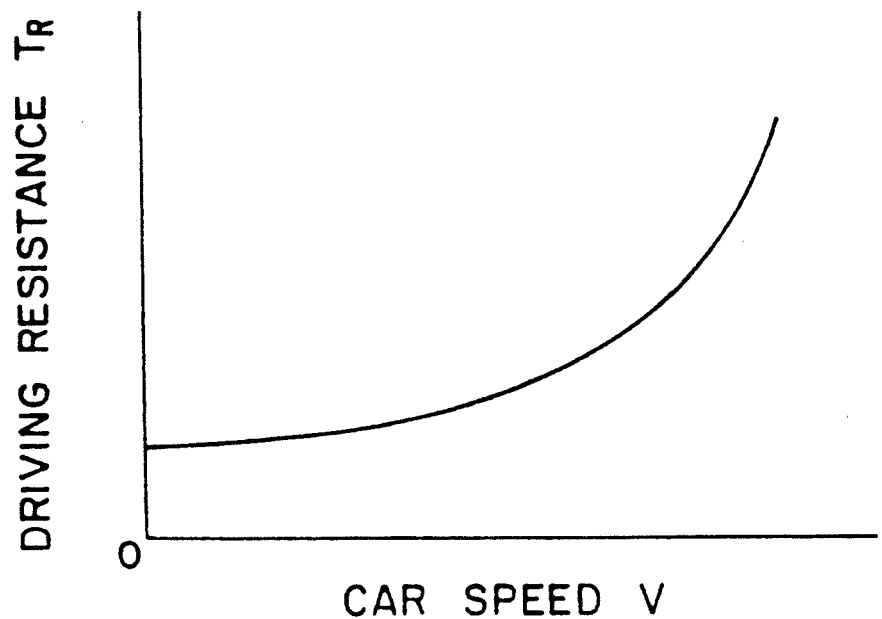
FIG. 8 is a map illustrating a relationship between a car speed and a driving resistance.

Then, a reference driving torque $T_B$ of the engine 11 then is calculated in accordance with the following expression (2):

$$T_B = G_{XF} \cdot W_b \cdot r + T_R \tag{2}$$

where $G_{XF}$ is a modified advancing direction acceleration obtained by passing the advancing direction acceleration $G_X$ through a low-pass filter not shown which delays a variation of the advancing direction acceleration $G_X$. The low-pass filter has a function of modifying the advancing direction acceleration $G_X$ so that, since the advancing direction acceleration $G_X$ of the vehicle 68 can be regarded as equivalent to the coefficient of friction between the tires and the road, even when the advancing direction acceleration $G_X$ of the vehicle 68 changes so that the slip ratio S of the tires may come out of the value equal to or around the aimed slip ratio $S_O$ corresponding to a maximum value of the coefficient of friction between the tires and the road, the slip ratio S of the tires may be kept to a value equal to or around the aimed slip ratio $S_O$ corresponding to the maximum value of the coefficient of friction between the tires and the road. Further, in the expression (2) given above, $W_b$ is a weight of the vehicle 68, r an effective radius of the front wheels 60 and 61, and $T_R$ is a driving resistance. While the driving resistance $T_R$ can be calculated as a function of the car speed V, it is otherwise determined, in the present embodiment, from such a map as shown in FIG. 8.

Figure 9:
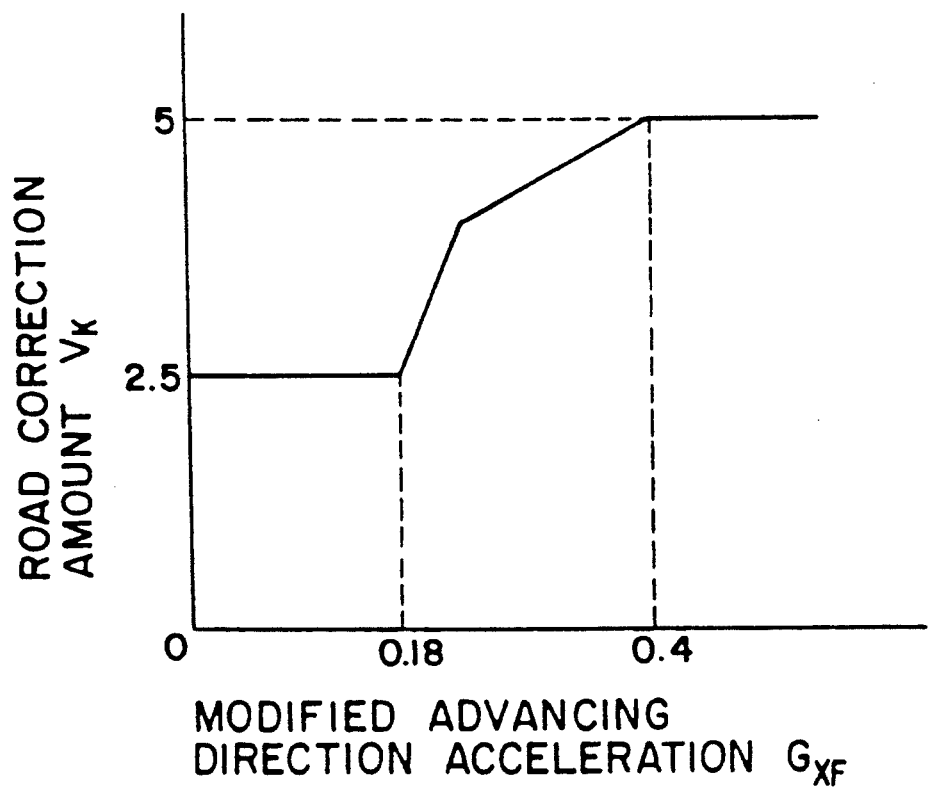
FIG. 9 is a map illustrating a relationship between a modified advancing direction acceleration and a road correction amount for a speed.

In the meantime, it is a normal condition that a slip of 3% or so occurs between the wheels and the road during acceleration of the vehicle 68, and when the vehicle 68 drives on a rough road such as a gravel road, the maximum value of the coefficient of friction between the tires and the road corresponding to the aimed slip ratio $S_O$ is usually greater than that when the vehicle runs on a low μ road. Accordingly, taking such slip amount and road conditions into consideration, an aimed driving wheel speed $V_{FO}$ which is an aimed circumferential speed of the front wheels 60 and 61 is calculated in accordance with the following expression (3):

$$V_{FO} = 1.03 \cdot V + V_K \tag{3}$$

where $V_K$ is a road correction amount set in advance in accordance with the modified advancing direction acceleration $G_{XF}$. The road correction amount $V_K$ is set so as to have such a tendency that it increases stepwise as the value of the modified advancing direction acceleration $G_{XF}$ increases, and in the present embodiment, the road correction amount $V_K$ is determined from such a map as shown in FIG. 9 which has been produced in accordance with results of driving tests and so forth.

Subsequently, the slip amount s which is a difference between the car speed V and the aimed driving wheel speed $V_{FO}$ is calculated in accordance with the following expression (4):

$$s = \frac{V_{FL} + V_{FR}}{2} - V_{FO} \tag{4}$$

Then, the slip amount s is multiplied by $K_I$ and integrated for each sampling period of the main timer as represented by the expression (5) given below to determine an integrated correction torque $T_I$ ($T_I \leq 0$) for increasing the stability of control over the aimed driving torque $T_{OS}$.

$$T_I = \sum_{i=1}^{n} K_I \cdot s(i) \tag{5}$$

Similarly, a proportional correction torque $T_P$ for moderating a control delay of the aimed driving torque $T_{OS}$ which increases in proportion to the slip amount s is calculated by multiplication of the slip amount s by a proportional coefficient $K_P$ as represented by the following expression (6):

$$T_P = K_P \cdot s \tag{6}$$

Then, making use of the expressions (2), (5) and (6) given above, the aimed driving torque $T_{OS}$ of the engine 11 is calculated in accordance with the following expression (7):

$$T_{OS} = \frac{T_B - T_I - T_P + T_R}{\rho_m \cdot \rho_d} \tag{7}$$

where $\rho_m$ is a gear ratio of a transmission not shown, and $\rho_d$ is a reduction ratio of a differential gear.

The vehicle 68 includes a manually operable switch not shown for permitting a driver to select slip control, and when a driver operates the manually operable switch to select slip control, operation of slip control described below will be executed.

Figure 10:
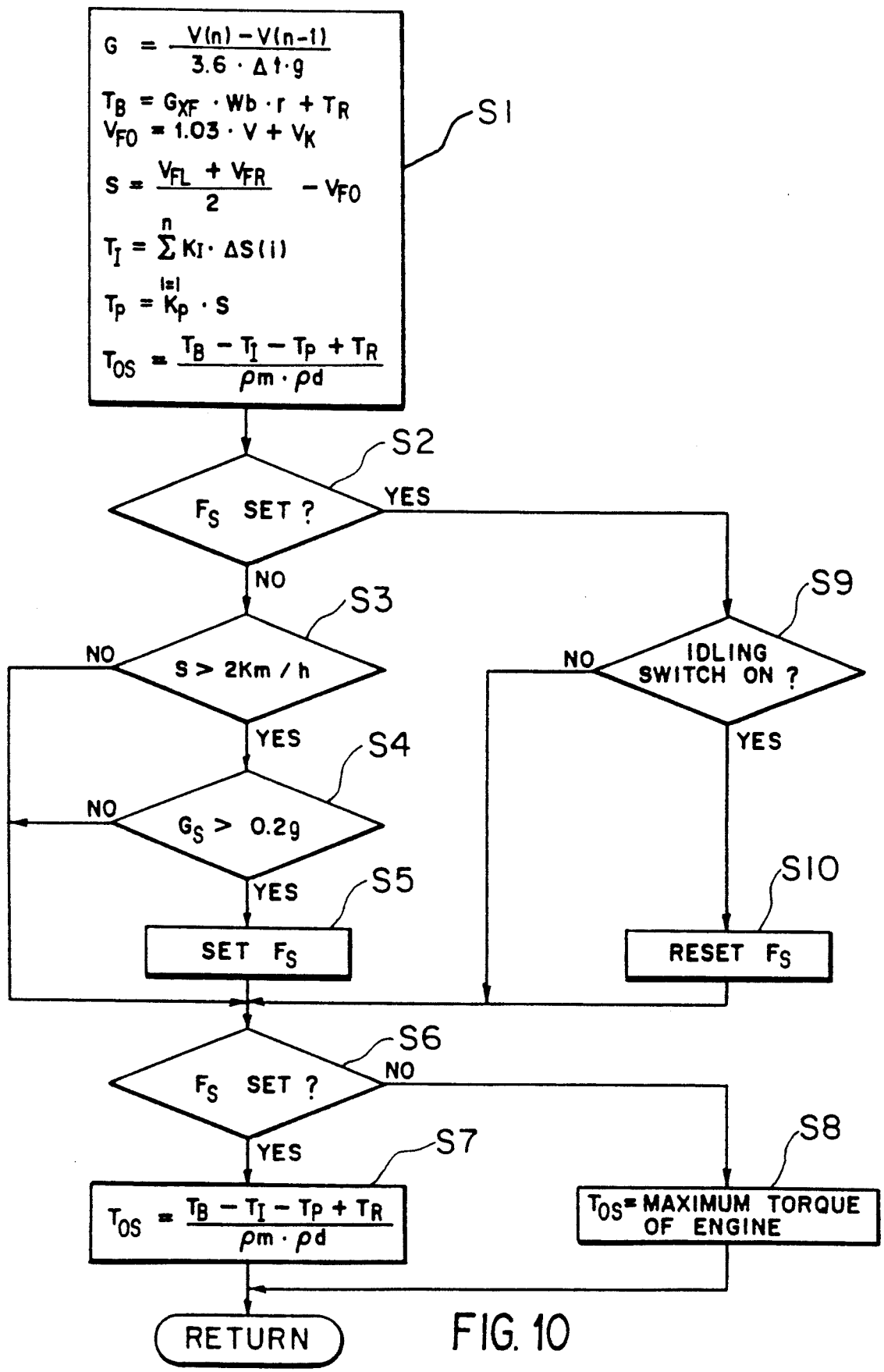
FIG. 10 is a flow chart illustrating a flow of of operations of slip control in the flow chart of FIG. 4.

Referring to FIG. 10 which shows a flow of processing of such slip control, the TCL 58 calculates, at step S1, an aimed driving torque $T_{OS}$ by such detection of various data and calculating processing as described hereinabove. Such calculating processing, however, is executed independently of operation of the manually operable switch.

Subsequently at step S2, it is judged whether or not a slip control flag $F_S$ is in a set state. Since the slip control flag $F_S$ is not in a set state at the first stage, the TCL 58 judges subsequently at step S3 whether or not the slip amount s of the front wheels 60 and 61 is greater than a preset threshold value, for example, 2 km per hour.

If it is judged at step S3 that the slip amount s is greater than 2 km per hour, the TCL 58 judges at step S4 whether or not the changing rate $G_s$ of the slip amount s is higher than 0.2 g.

If it is judged at step S4 that the slip amount changing rate $G_S$ is higher than 0.2 g, the slip control flag $F_S$ is set at step S5, and then at step S6, it is judged again whether or not the slip control flag $F_S$ is in a set state.

In case it is judged at step S6 that the slip control flag $F_S$ is in a set state, the aimed driving torque $T_{OS}$ for slip control calculated in advance in accordance with the expression (7) given hereinabove is adopted as an aimed driving torque $T_{OS}$ of the engine 11 at step S7.

On the contrary, in case it is judged at step S6 that the slip control flag $F_S$ is in a reset state, the TCL 58 outputs, at step S8, the maximum torque of the engine 11 as an aimed driving torque $T_{OS}$. Consequently, the ECU 54 causes the duty ratio of the torque controlling solenoid valves 46 and 51 to drop to the 0% side, and as a result, the engine 11 generates a driving torque corresponding to an amount of operation of the accelerator pedal 26 by the driver.

It is to be noted that the reason why the TCL 58 outputs the maximum torque of the engine 11 at step S8 is that it is intended to cause, from the point of view of safety of control and so forth, the ECU 54 to operate in a direction in which the torque controlling solenoid valves 46 and 51 are deenergized without fail so that the engine 11 may certainly generate a driving torque corresponding to an amount of operation of the accelerator pedal 26 by the driver.

In case it is judged at step S3 that the slip amount s of the front wheels 60 and 61 is smaller than 2 km per hour, or in case it is judged at step S4 that the slip amount changing rate $G_S$ is equal to or lower than 0.2 g, the control sequence advances directly to step S6. Consequently, the TCL 58 outputs, at step S8, the maximum torque of the engine 11 as an aimed driving torque $T_{OS}$, and as a result, the ECU 54 causes the duty ratio of the torque controlling solenoid valves 46 and 51 to drop to the 0% side. Consequently, the engine 11 generates a driving torque corresponding to an amount of operation of the accelerator pedal 26 by the driver.

On the other hand, in case it is judged at step S2 that the slip control flag $F_S$ is in a set state, it is subsequently judged at step S9 whether or not the idling switch 57 is in an on state, that is, whether or not the throttle valve 15 is in a fully closed condition.

In case it is judged at step S9 that the idling switch 57 is on, since this means that the driver leaves the accelerator pedal 26 in a non-operated condition, the slip control flag $F_S$ is reset at step S10, whereafter the control sequence advances to step S6.

On the contrary, in case it is judged at step S9 that the idling switch 57 is off, it is subsequently judged again at step S6 whether or not the slip control flag Fs is in a set state.

It is to be noted that, when the driver does not operate the manually operable switch for the selection of slip control, the TCL 58 calculates an aimed driving torque $T_{OS}$ for slip control in such a manner as described hereinabove and then calculates an aimed driving torque of the engine 11 for use when turning control is to be executed.

Upon such turning control of the vehicle 68, the TCL 58 calculates an aimed lateral acceleration $G_{YO}$ of the vehicle 68 from the steering shaft turning angle $\delta_H$ and car speed V and then sets, in accordance with the thus calculated aimed lateral acceleration $G_{YO}$, an acceleration in the advancing direction of the car body at which the vehicle 68 may not be put into an extreme understeering condition, that is, an aimed advancing direction acceleration $G_{XO}$. Then, an aimed driving torque of the engine 11 corresponding to the aimed advancing direction acceleration $G_{XO}$ is calculated.

By the way, while a lateral acceleration $G_Y$ of the vehicle 68 can be calculated actually making use of a rear wheel speed difference $|V_{RL} - V_{RR}|$, since it is possible to forecast the value of the lateral acceleration $G_Y$ acting on the vehicle 68 making use of the steering shaft turning angle $\delta_H$, there is an advantage that rapid control can be executed.

However, even if an aimed driving torque of the engine is calculated from the steering shaft turning angle $\delta_H$ and car speed V, there is the possibility that a will of the driver may not reflect on driving and the driver may be dissatisfied with the drivability of the vehicle 68. Therefore, it is desirable to determine, from an amount of operation of the accelerator pedal 26, a requested driving torque $T_d$ of the engine 11 requested by the driver and set an aimed driving torque of the engine 11 taking the thus determined requested driving torque $T_d$ into consideration. Further, when the amount of variation in aimed driving torque of the engine 11 which is set for each 15 milliseconds is very great, a shock will take place upon acceleration or deceleration of the vehicle 68, which deteriorates comfort driving of the vehicle 68. Accordingly, in case the variation in aimed driving torque of the engine 11 increases to such a degree at which the deterioration of the comfort driving of the vehicle 68 is invited, also it is necessary to restrict the variation of the aimed driving torque.

In addition, unless the aimed driving torque of the engine 11 is modified depending upon whether the road is a high $\mu$ road or a low $\mu$ road, if the engine 11 operates, for example, with an aimed driving torque for a high $\mu$ road during driving on a low $\mu$ road, there is the possibility that the front wheels 60 and 61 may slip to disable safe driving of the vehicle 68. Therefore, it is desirable for the TCL 58 to calculate an aimed driving torque $T_{OH}$ for a high $\mu$ road and another aimed driving torque $T_{OL}$ for a low $\mu$ road.

Figure 11:
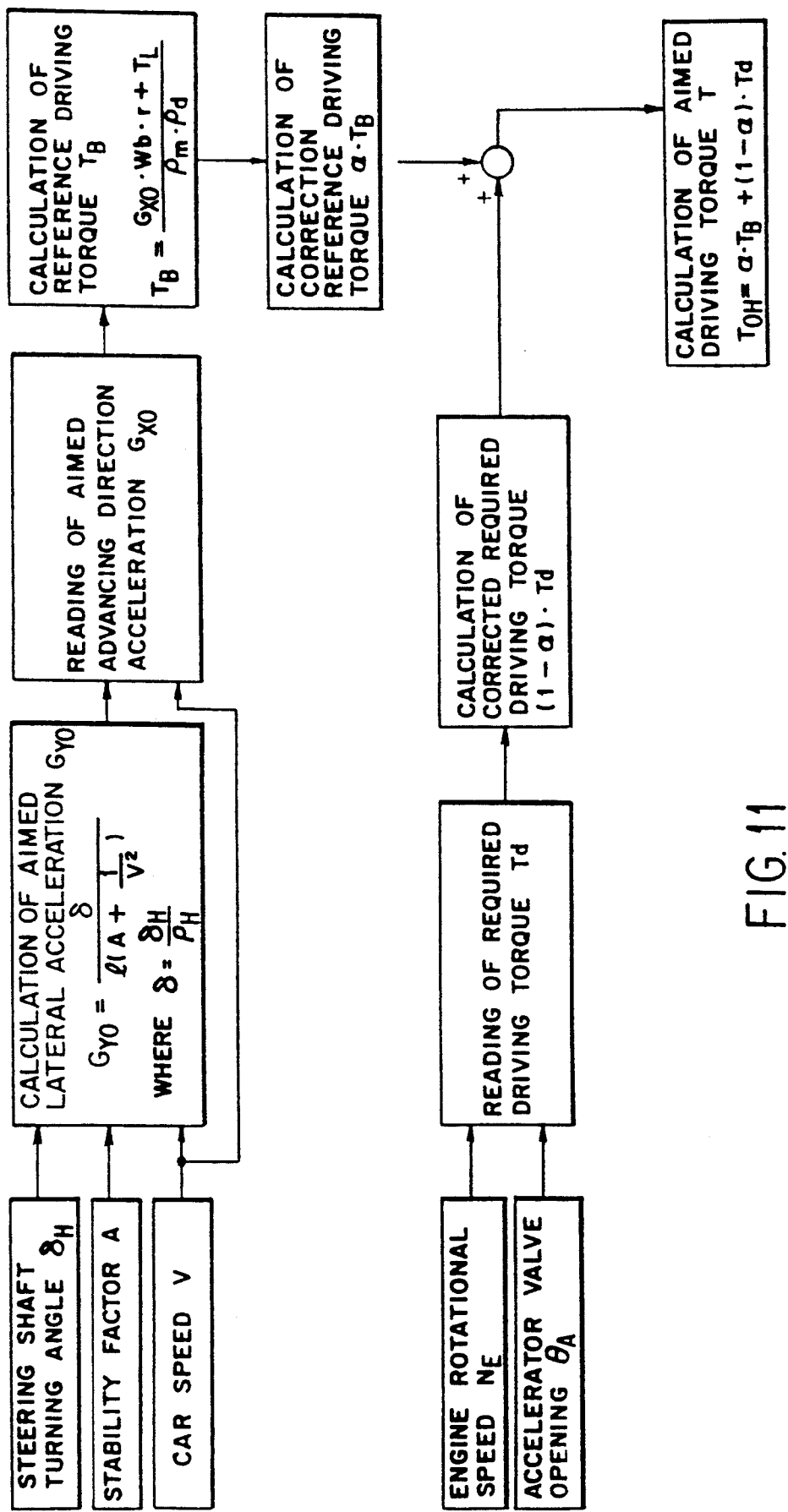
FIG. 11 is a block diagram illustrating a procedure of calculating an aimed driving torque for a high μ road.

Turning control for a high $\mu$ road in which such perception as described above is taken into consideration is illustrated in a calculation block diagram shown in FIG. 11. Referring to FIG. 11, the TCL 58 first calculates a car speed V in accordance with the expression (1) given hereinabove from outputs of the pair of rear wheel rotation sensors 66 and 67 and also calculates a steering angle $\delta$ of the front wheels 60 and 61 in accordance with the expression (8) given below from a detection signal from the steering angle sensor 70, and then calculates an aimed lateral acceleration $G_{YO}$ of the vehicle 68 in accordance with the following expression (9):

$$\delta = \frac{\delta_H}{\rho_H} \quad (8)$$

$$G_{YO} = \frac{\delta}{l\left(A + \frac{1}{V^2}\right)} \quad (9)$$

where $\rho_H$ is a steering gear ratio, l a wheel base of the vehicle 68, and A a stability factor of the vehicle 68.

As well known, the stability factor A is a value which depends upon construction of a suspension system, characteristics of the tires and so forth. More particularly, the stability factor A is represented as an inclination of a tangential line to such a curve as shown, for example, in FIG. 12 which indicates a relationship between an actual lateral acceleration $G_Y$ which is produced with the vehicle 68 upon normal turning on a circular road and a steering angle ratio $\delta_H/\delta_{HO}$ of the steering shaft 69 which is a ratio of a steering angle $\delta_H$ of the steering shaft 69 upon acceleration to a turning angle $\delta_{HO}$ of the steering shaft 69 in a very low speed running condition in which the lateral acceleration $G_Y$ presents a value around zero with reference to the neutral position $\delta_M$ of the steering shaft 69. In short, in a region wherein the lateral acceleration $G_Y$ is small and the car speed V is not very high, the stability factor A presents a substantially constant value (A = 0.002), but where the lateral acceleration $G_Y$ exceeds 0.6 g, the stability factor A increases suddenly, and consequently, the vehicle 68 exhibits a very strong under-steering tendency.

Figure 12:
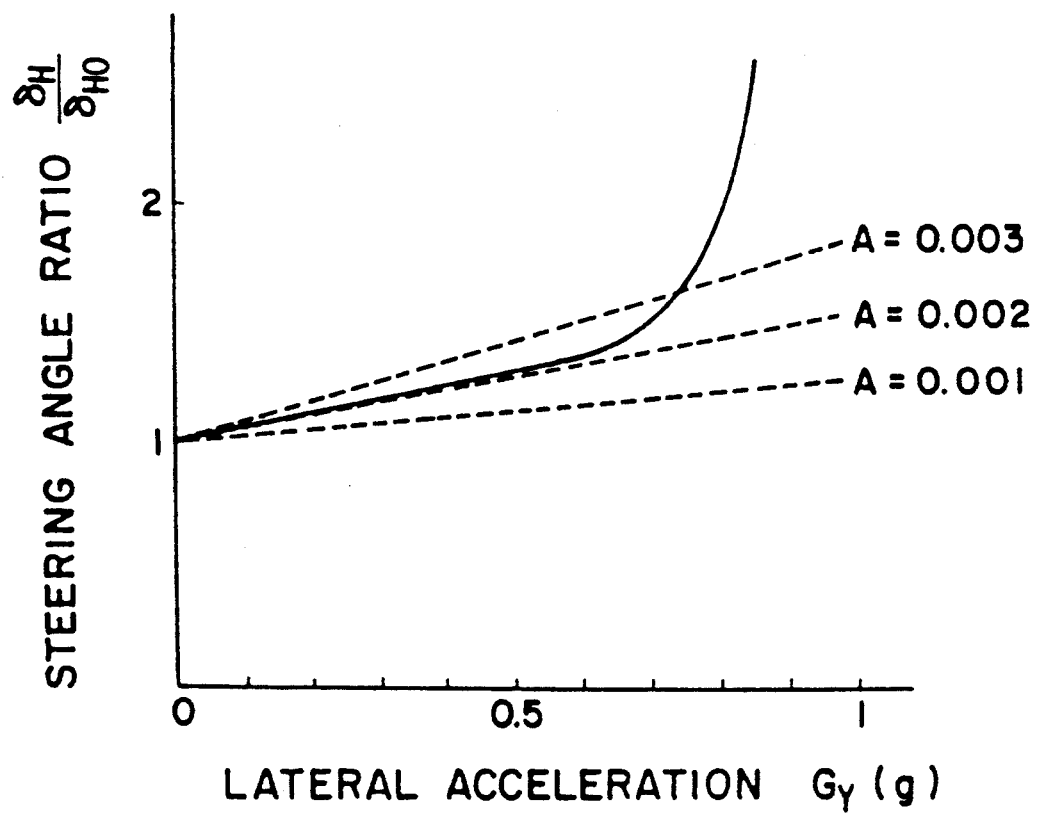
FIG. 12 is a graph showing a relationship between a lateral acceleration and a steering angle ratio and illustrating a stability factor.

From those facts, where the graph of FIG. 12 is involved, the stability factor A should be set to a value lower than 0.002 and the driving torque of the engine 11 should be controlled so that the aimed lateral acceleration $G_{YO}$ of the vehicle 68 may be lower than 0.6 g.

Figure 13:
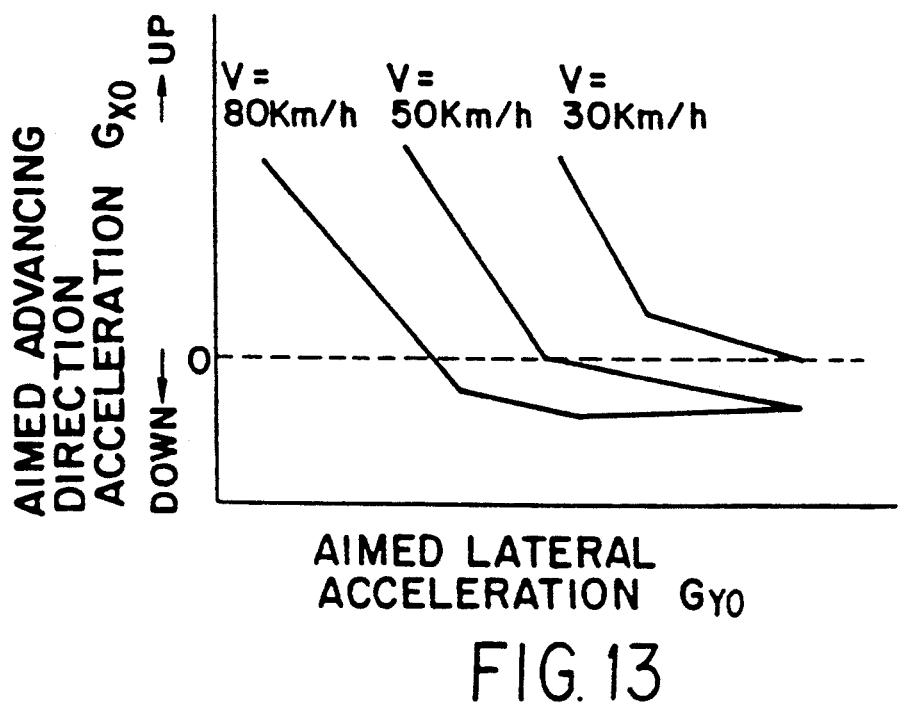
FIG. 13 is a map illustrating a relationship between an aimed lateral acceleration and an aimed advancing direction acceleration with respect to different car speeds.
Figure 14:
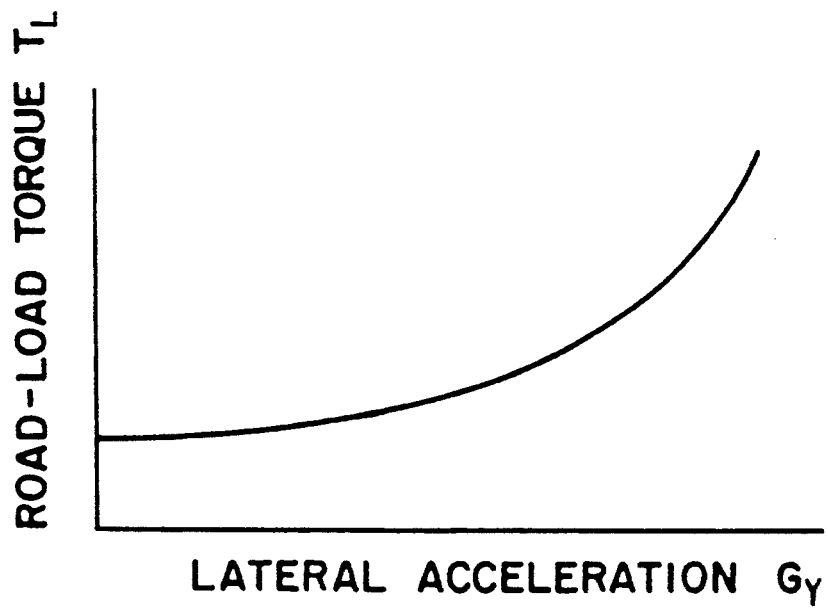
FIG. 14 is a map illustrating a relationship between a lateral acceleration and a road-load torque.

Referring back to FIG. 11, after an aimed lateral acceleration $G_{YO}$ is calculated in this manner, an aimed advancing direction acceleration $G_{XO}$ which is set in advance in accordance with the magnitude of the aimed lateral acceleration $G_{YO}$ and the car speed V is determined from such a map as shown in FIG. 13 which is stored in advance in the TCL 58. Then, a reference driving torque $T_B$ of the engine 11 is calculated from the thus determined aimed advancing direction acceleration $G_{XO}$ in accordance with the following expression (10):

$$T_B = \frac{G_{XO} \cdot W_b \cdot r + T_L}{\rho_m \cdot \rho_d} \quad (10)$$

where $T_L$ is a road-load torque which is a resistance to a road which is obtained as a function of the lateral acceleration $G_Y$ of the vehicle 68. In the present embodiment, such road-load torque $T_L$ is determined from such a map as shown in FIG. 14.

Then, in order to determine an adoption rate of the reference driving torque $T_B$, the reference driving torque $T_B$ is multiplied by a weighting coefficient $\alpha$ to obtain a correction reference driving torque. While the weighting coefficient $\alpha$ is set experimentally by turning driving of the vehicle, a value around 0.6 or so is adopted for a high $\mu$ road.

Figure 15:
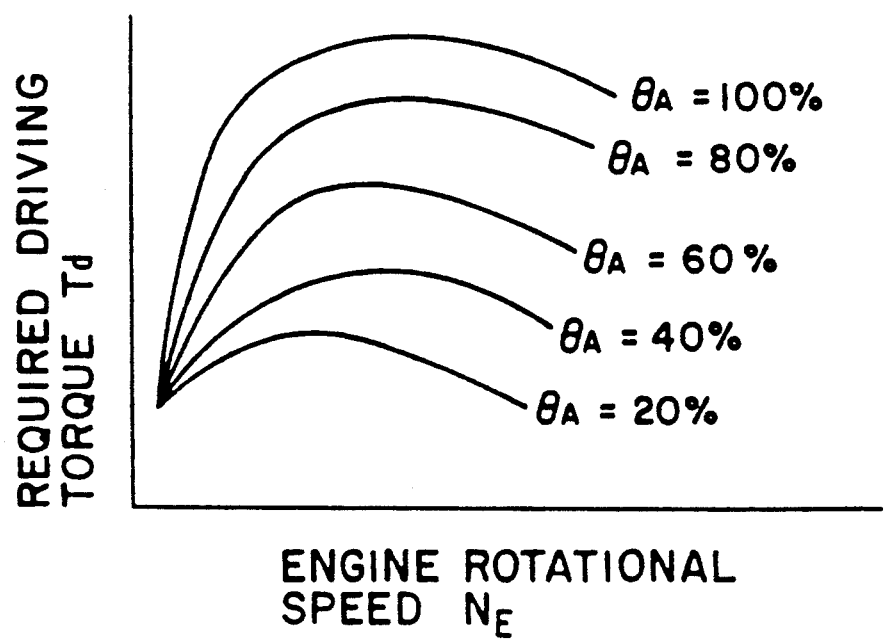
FIG. 15 is a map illustrating a relationship between an engine rotational speed and a requested driving torque with respect to different accelerator valve openings.

On the other hand, a requested driving torque $T_d$ requested by the driver is determined from such a map as shown in FIG. 15 based on an engine rotational speed $N_E$ detected by the crank angle sensor 55 and an accelerator opening $\theta_A$ detected by the accelerator opening sensor 59. Then, a correction requested driving torque corresponding to the weighting coefficient $\alpha$ is determined by multiplying the requested driving torque $T_d$ by $1-\alpha$. For example, in case the weighting coefficient $\alpha$ is set to $\alpha=0.6$, the adoption rate between the reference driving torque $T_B$ and the requested driving torque TD is 6:4.

Accordingly, an aimed driving torque $T_{OH(n)}$ of the engine 11 is calculated in accordance with the following expression (11):

$$T_{OH(n)} = \alpha \cdot T_B + (1-\alpha) \cdot T_d \quad (11)$$

A manually operable switch not shown for permitting a driver to select turning control for a high $\mu$ road is provided on the vehicle 68, and when the driver operates the manually operable switch to select turning control for a high $\mu$ road, operation of turning control for a high $\mu$ road which will be described below is executed.

Figure 16:
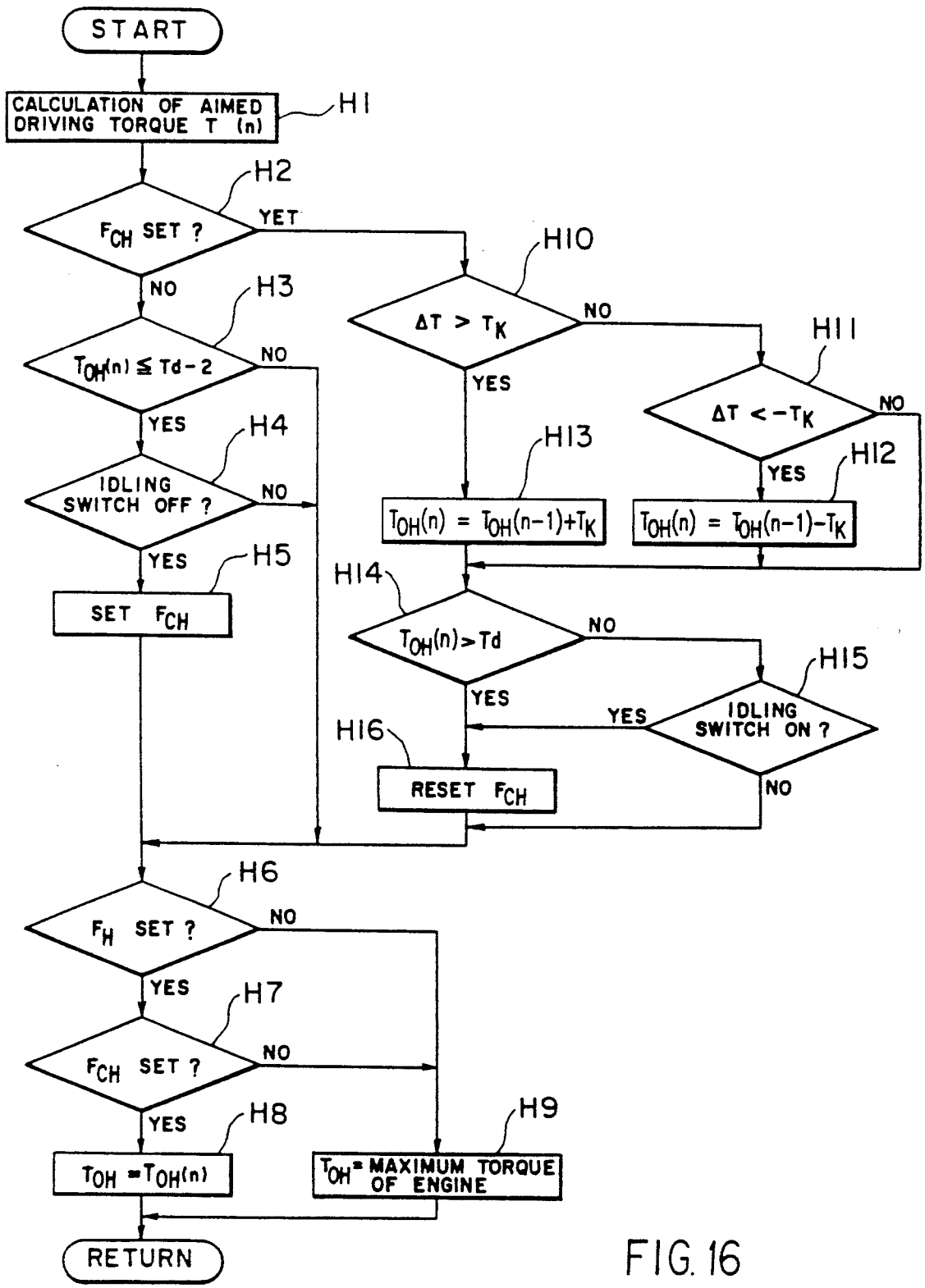
FIG. 16 is a flow chart illustrating a flow of operations of turning control for a high μ road in the flow chart of FIG. 4.

A flow of control for determining an aimed driving torque $T_{OH}$ for such turning control for a high $\mu$ road is shown in FIG. 16. Referring to FIG. 16, first at step H1, an aimed driving torque $T_{OH(n)}$ is calculated by such detection of various data and calculating processing as described hereinabove. Such calculating processing at step H1 is executed independently of operation of the manually operable switch.

Then at step H2, it is judged whether or not the vehicle 68 is in turning control for a high $\mu$ road, that is, whether or not a high $\mu$ road turning control flag $F_{CH}$ is in a set state. Since the vehicle 68 is not in high $\mu$ road turning control first, it is determined that the high $\mu$ road turning control flag $F_{CH}$ is in a reset state, and it is subsequently judged at step H3 whether or not the aimed driving torque $T_{OH(n)}$ is equal to or smaller than a preset threshold value, for example, $T_d - 2$. Although the aimed driving torque $T_{OH(n)}$ can be calculated while the vehicle 68 is in a straightforwardly advancing condition, normally the value then is much greater than a requested driving torque $T_d$ requested by a driver. However, since such requested driving torque $T_d$ presents a small value upon turning of the vehicle 68, a time when the aimed driving torque $T_{OH(n)}$ becomes equal to or smaller than the threshold value $T_d - 2$ is determined as a starting requirement for turning control.

It is to be noted that the reason why the threshold value is set to $T_d - 2$ here is that it is intended to provide the same as a hysteresis for preventing hunting in control.

In case it is judged at step H3 that the aimed driving torque $T_{OH(n)}$ is equal to or smaller than the threshold value $T_d - 2$, the TCL 58 then judges at step H4 whether of not the idling switch 57 is in an off state.

In case it is judged at step H4 that the idling switch 57 is in an off state, that is, the accelerator pedal 26 is in an operated condition by the driver, the high $\mu$ road turning control flag $F_{CH}$ is set at step H5. Then at step H6, it is judged whether or not the steering angle neutral position learning completion flag $F_H$ is in a set state, that is, the reliability of the steering angle $\delta$ detected by the steering angle sensor 70 is judged.

In case it is judged at step H6 that the steering angle neutral position learning completion flag $F_H$ is in a set state, it is judged again at step H7 whether or not the high $\mu$ road turning control flag $F_{CH}$ is in a set state.

Since the high $\mu$ road turning control flag $F_{CH}$ has been set at step H5 in the procedure described so far, it is judged at step H7 that the high $\mu$ road turning control flag $F_{CH}$ is in a set state, and then at step H8, the aimed driving torque $T_{OH(n)}$ calculated precedently in accordance with the expression (11) given hereinabove is adopted as an aimed driving torque $T_{OH}$ for high $\mu$ road turning control.

On the contrary, in case it is judged at step H6 that the steering angle neutral position learning completion flag $F_H$ is not in a set state, since this means that the reliability of the steering angle $\delta$ calculated in accordance with the expression (8) is low, the TCL 58 does not adopt the aimed driving torque $T_{OH(n)}$ calculated in accordance with the expression (11) but outputs, as an aimed driving torque $T_{OH}$, the maximum driving torque of the engine 11. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

On the other hand, in case it is judged at step H3 that the aimed driving torque $T_{OH(n)}$ is not equal to or lower than the threshold value $T_d - 2$, the control sequence does not advance to the turning control but advances to step H9 by way of step H6 or H7. At step H9, the TCL 58 outputs the maximum torque of the engine 11 as an aimed driving torque $T_{OH}$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

Similarly, also in case it is judged at step H4 that the idling switch 57 is in an on state, that is, the accelerator pedal 26 is not in an operated condition by the driver, the TCL 58 outputs, at step H9, the maximum torque of the engine 11 as an aimed driving torque $T_{OH}$, and consequently, the ECU 54 lowers the duty ratio of the torque controlling solenoid valves 46 and 51 to the zero percent side. As a result, the engine 11 generates a driving torque corresponding to an amount of operation of the accelerator pedal 26 by the driver, and the control sequence does not advance to the turning control.

In case it is judged at step H2 that the high $\mu$ road turning control flag $F_{CH}$ is in a set state, it is subsequently judged at step H10 whether or not the difference $\Delta T$ between the aimed driving torque $T_{OH(n)}$ calculated in the present control cycle and the aimed driving torque $T_{OH(n-1)}$ calculated in a preceding control cycle is greater than a preset allowable variation amount $T_K$. The allowable variation amount $T_K$ is a torque variation to such a degree at which a passenger of the vehicle 68 may not feel an acceleration or deceleration shock. When it is intended to restrict the aimed advancing direction acceleration $G_{XO}$ of the vehicle 68 to, for example, 0.1 g per second, the allowable variation amount $T_K$ is determined using the expression (10) given hereinabove as $$T_K = 0.1 \cdot \frac{W_b \cdot r}{\rho_m \cdot \rho_d} \cdot \Delta t$$

If it is judged at step H10 that the difference $\Delta T$ between the aimed driving torque $T_{OH(n)}$ calculated in the present control cycle and the aimed driving torque $T_{OH(n-1)}$ calculated in the preceding control cycle is not greater than the preset allowable variation amount $T_K$, it is subsequently judged at step H11 whether or not the difference $\Delta T$ between the aimed driving torque $T_{OH(n)}$ of the resent control cycle and the aimed driving torque $T_{OH(n-1)}$ of the preceding cycle is smaller than the negative allowable variation amount $T_K$.

If it is judged at step H11 that the difference $\Delta T$ between the aimed driving torque $T_{OH(n)}$ of the present control cycle and the aimed driving torque $T_{OH(n-1)}$ of the preceding control cycle is not smaller than the negative allowable variation amount $T_K$, since this means that the absolute value $|\Delta T|$ of the difference between the aimed driving torque $T_{OH(n)}$ of the present control cycle and the aimed driving torque $T_{OH(n-1)}$ of the preceding control cycle is smaller than the allowable variation amount $T_K$, the aimed driving torque $T_{OH(n)}$ calculated in the present control cycle is adopted as it is as an aimed driving torque $T_{OH}$.

On the contrary, in case it is judged at step H11 that the difference $\Delta T$ between the aimed driving torque $T_{OH(n)}$ calculated in the present control cycle and the aimed driving torque $T_{OH(n-1)}$ calculated in the preceding control cycle is smaller than the negative allowable variation amount $T_K$, the aimed driving torque $T_{OH(n)}$ for the present control cycle is set, at step H12, in accordance with the following expression:

$$T_{OH(n)} = T_{OH(n-1)} - T_K$$

In short, the amount of decrease from the aimed driving torque $T_{OH(n-1)}$ calculated in the preceding control cycle is restricted by the allowable variation amount $T_K$ to reduce a speed reduction shock involved in reduction in driving torque of the engine 11.

On the other hand, in case it is judged at step H10 that the difference $\Delta T$ between the aimed driving torque $T_{OH(n)}$ calculated in the present control cycle and the aimed driving torque $T_{OH(n-1)}$ calculated in the preceding control cycle is greater than the allowable variation amount $T_K$, the aimed driving torque $T_{OH(n)}$ for the present control cycle is set, at step H13, in accordance with the following expression:

$$T_{OH(n)} = T_{OH(n-1)} + T_K$$

In short, also in the case of increase of the driving torque, similarly as in the case of decrease of the driving torque described above, if the difference $\Delta T$ between the aimed driving torque $T_{OH(n)}$ calculated in the present control cycle and the aimed driving torque $T_{OH(n-1)}$ calculated in the preceding control cycle exceeds the allowable variation amount $T_K$, the amount of increase from the aimed driving torque $T_{OH(n-1)}$ calculated in the preceding control cycle is restricted with the allowable variation amount $T_K$ to reduce an acceleration shock involved in increase in driving torque of the engine 11.

Figure 17:
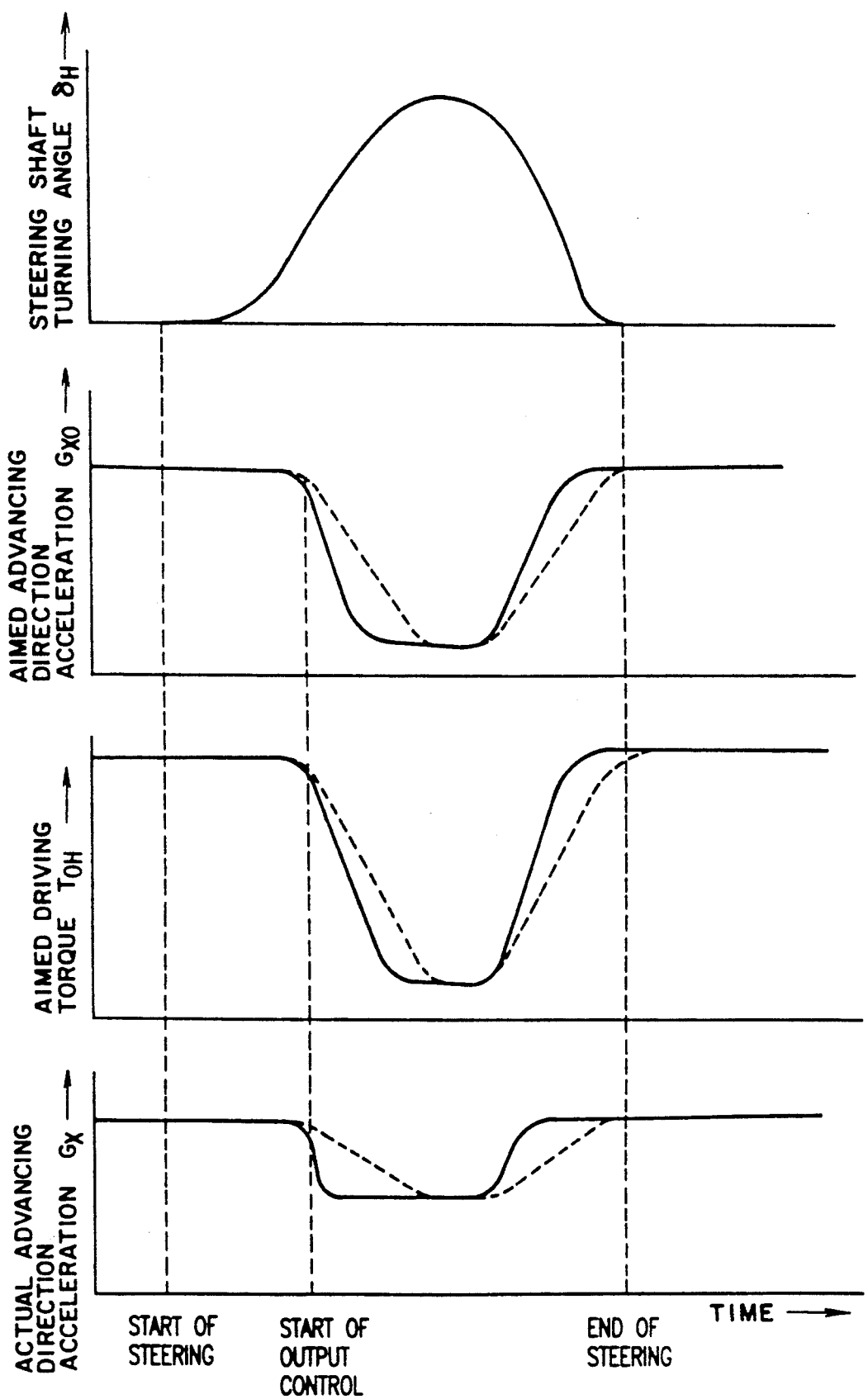
FIG. 17 is a graph illustrating a relationship of a steering shaft turning angle, aimed driving torques and an advancing direction acceleration to time.

Referring to FIG. 17, varying conditions of the steering shaft turning angle $\delta_H$, aimed advancing direction acceleration $G_{XO}$, aimed driving torque $T_{OH}$ and actual advancing direction acceleration $G_X$ when the variation amount of the aimed driving torque $T_{OH}$ is restricted in this manner are indicated by broken lines, and varying conditions of them when the variation amount of the aimed driving torque $T_{OH}$ is not restricted are indicated by solid lines. As seen from FIG. 17, the variation of the actual advancing direction acceleration $G_X$ in the former case is moderated with respect to that in the latter case, and accordingly, it is apparent that an acceleration or deceleration shock is eliminated.

Referring back to FIG. 16, after an aimed driving torque $T_{OH(n)}$ is set in this manner, the TCL 58 judges at step H14 whether or not the aimed driving torque $T_{OH}$ is higher than the requested driving torque $T_d$ requested by the driver.

Here, in case the high $\mu$ road turning control flag $F_{CH}$ is in a set state, the aimed driving torque $T_{OH}$ is not higher than the requested driving torque $T_d$ by the driver, and accordingly, it is subsequently judged at step H15 whether or not the idling switch 57 is in an on state.

If it is judged at step H15 that the idling switch 57 is not in an on state, since this means that turning control is required, the control sequence advances to step H6 described hereinabove.

On the contrary, in case it is judged at step H14 that the aimed driving torque $T_{OH(n)}$ is higher than the requested driving torque $T_d$ by the driver, since this means that turning control of the vehicle 68 has completed, the TCL 58 subsequently resets the high $\mu$ road turning control flag $F_{CH}$ at step H16. Similarly, in case it is judged at step H15 that the idling switch 57 is in an on state, since this means that the accelerator pedal 26 is not in an operated condition, the control sequence advances to step H16 at which the high $\mu$ road turning control flag $F_{CH}$ is reset.

After the high $\mu$ road turning control flag $F_{CH}$ is reset at step H16, the TCL 58 outputs the maximum torque of the engine 11 as an aimed driving torque $T_{OH}$ at step H9.

Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

After an aimed driving torque $T_{OH}$ for high $\mu$ road turning control is calculated, the TCL 58 calculates an aimed driving torque $T_{OL}$ for turning control for a low $\mu$ road in such a manner as described hereinbelow.

By the way, since the aimed lateral acceleration $G_{YO}$ presents a higher value than the actual lateral acceleration $G_Y$ on a low $\mu$ road, it is judged whether or not the aimed lateral acceleration $G_{YO}$ is higher than a preset threshold value, and in case the aimed lateral acceleration $G_{YO}$ is higher than such threshold value, it is judged that the vehicle 68 is driving on a low $\mu$ road and turning control should be executed in accordance with the necessity.

Figure 18:
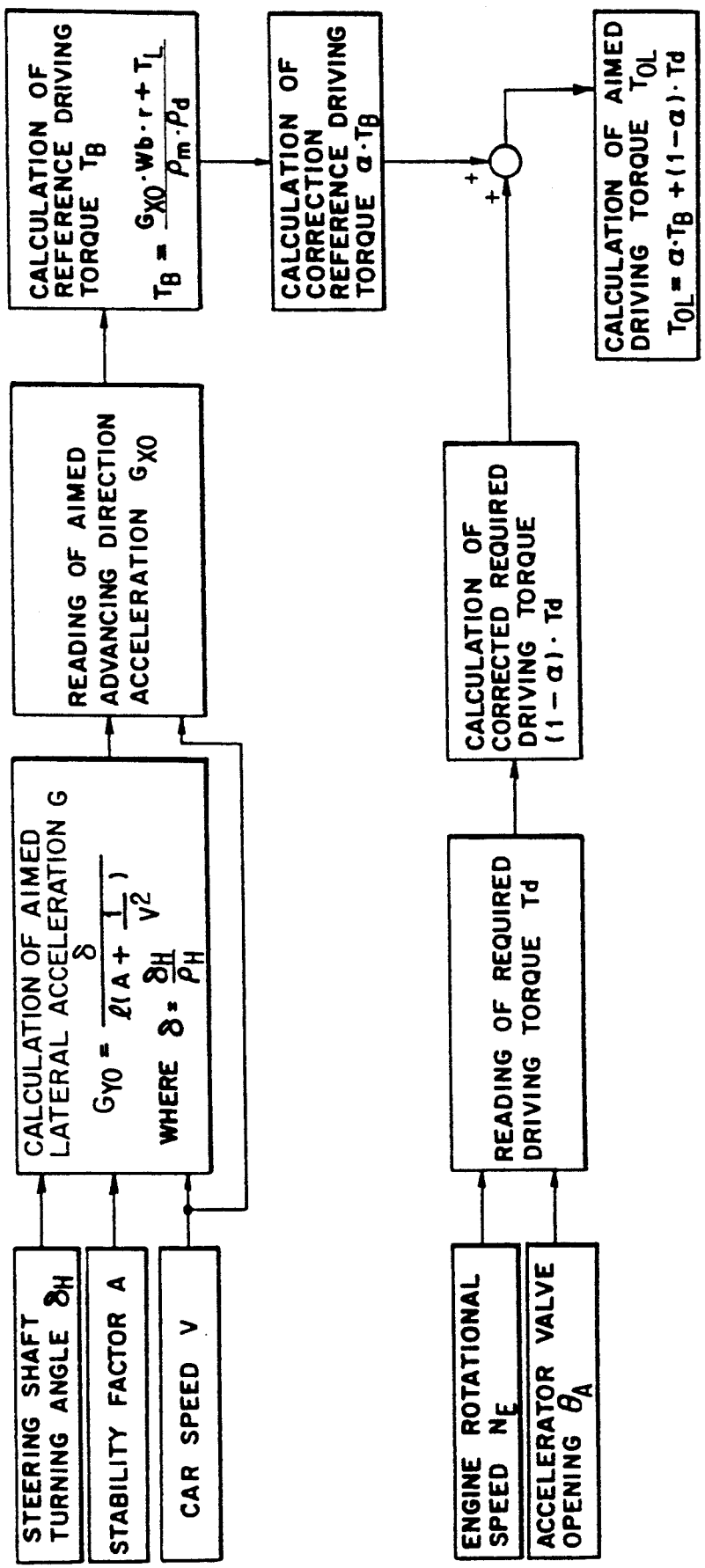
FIG. 18 is a block diagram illustrating a procedure of calculating an aimed driving torque for a low μ road.

Referring to FIG. 18 in which calculations for turning control for a low $\mu$ road are illustrated in blocks, an aimed lateral acceleration $G_{YO}$ is first calculated in accordance with the expression (9) given hereinabove from the steering shaft turning angle $\delta_H$ and the car speed V. For example, 0.005 is adopted as the stability factor A then.

Figure 19:
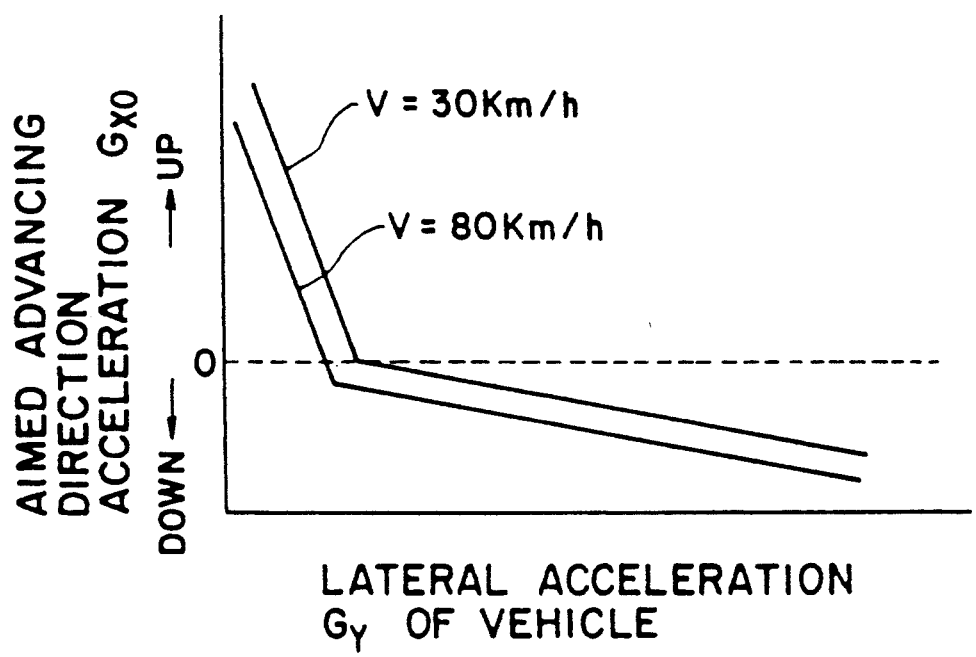
FIG. 19 is a map illustrating a relationship between an aimed lateral acceleration and an aimed advancing direction acceleration with respect to different car speeds.

Then, an aimed advancing direction acceleration $G_{XO}$ is found out from the aimed lateral acceleration $G_{YO}$ and car speed V. In the present embodiment, such aimed advancing direction acceleration $G_{XO}$ is read out from such a map as shown in FIG. 19. The map indicates an aimed advancing direction acceleration, at which the vehicle 68 can drive with safety in accordance with the magnitude of the aimed lateral acceleration $G_{YO}$, in connection with the car speed V, and is set in accordance with results of test driving and so forth.

Then, a reference driving torque $T_B$ is either calculated in accordance with the expression (10) given hereinabove from the aimed advancing direction acceleration $G_{XO}$ or determined from a map, and an adoption rate of such reference driving torque $T_B$ is determined. In this instance, the weighting coefficient $\alpha$ is greater than the coefficient $\alpha$ for a high $\mu$ road and is set, for example, to $\alpha=0.8$. This is intended to reduce the reflecting ratio of a requirement of the driver on a low $\mu$ road to enable the vehicle 68 to perform turning driving with safety and certainty on the low $\mu$ road on which the risk in driving is comparatively high.

On the other hand, as a requested driving torque $T_d$ by the driver, the value calculated in calculating operation of a requested driving torque $T_d$ for a high $\mu$ road is adopted as it is. Accordingly, an aimed driving torque $T_{OL(n)}$ in which the reference driving torque $T_B$ and the requested driving torque $T_d$ are taken into consideration is calculated in accordance with the following expression (12) similar to the expression (11) given hereinabove:

$$T_{OL(n)}=\alpha.T_B+(1-\alpha).T_d \qquad (12)$$

A manually operable switch not shown for permitting a driver to select turning control for a low $\mu$ road is provided on the vehicle 68, and when the driver operates the manually operable switch to select turning control for a low $\mu$ road, operation of the turning control for a low $\mu$ road which will be described below is executed.

Figure 20:
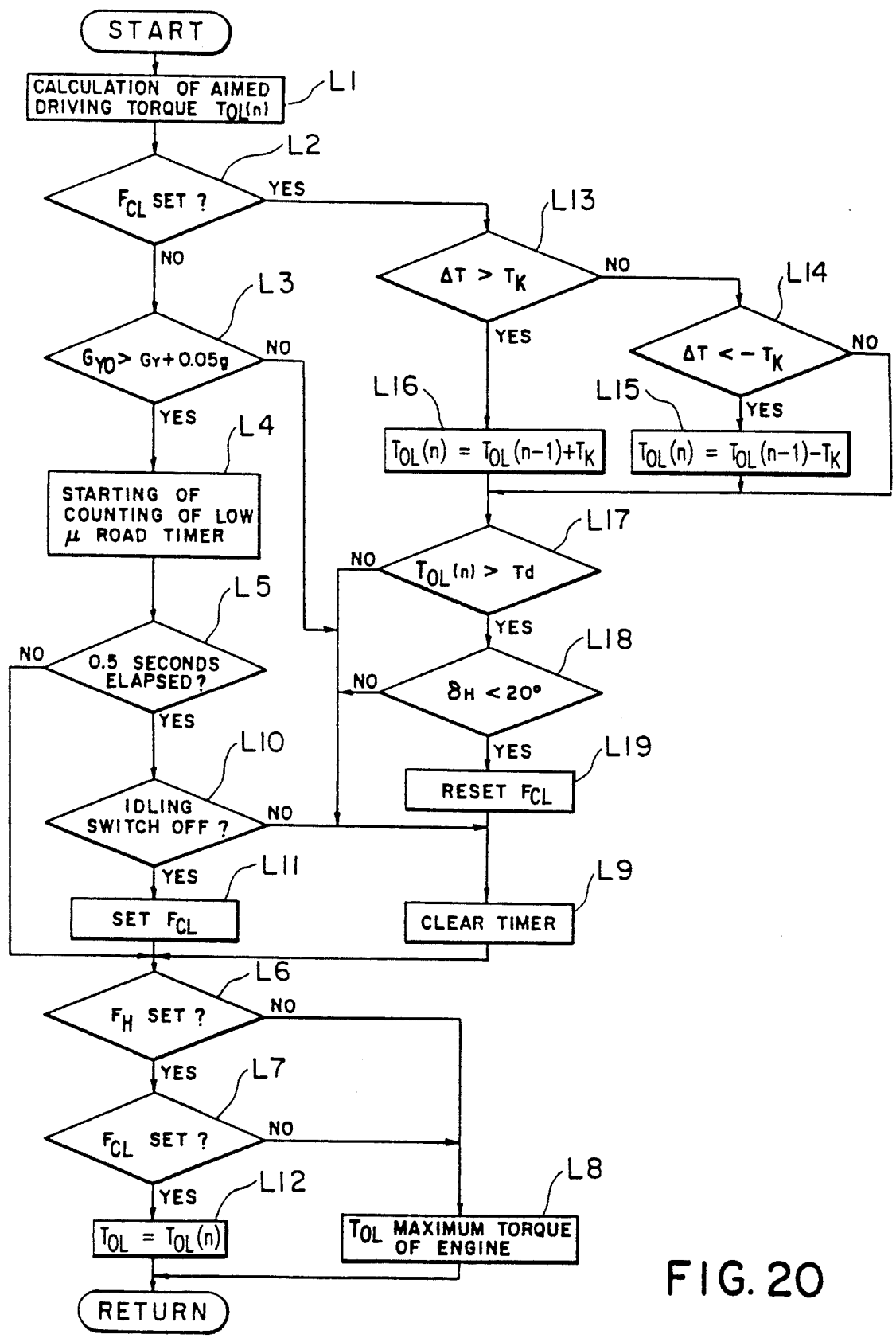
FIG. 20 is a flow chart illustrating a flow of operations of turning control for a low μ road in the flow chart of FIG. 4.

Referring to FIG. 20 which illustrates a flow of control for determining an aimed driving torque $T_{OL(n)}$ for turning control for a low $\mu$ road, an aimed torque $T_{OL(n)}$ is calculated first at step L1 by such detection of various data and calculating processing as described hereinabove. Such calculating operation, however, is executed independently of operation of the manually operable switch.

Then at step L2, it is judged whether or not the vehicle 68 is in a turning control condition for a low $\mu$ road, that is, whether or not the low $\mu$ road turning control flag $F_{CL}$ is in a set state. Since the vehicle 68 is not in a low $\mu$ road turning control condition first, it is judged here that the low $\mu$ road turning control flag $F_{CL}$ is in a reset state. Thus, it is subsequently judged at step L3 whether the aimed lateral acceleration $G_{YO}$ is greater than a threshold value obtained by adding 0.05 g to an actual lateral acceleration $G_Y$ calculated from a difference in rotational speed between the rear wheels 64 and 65. In short, because the aimed lateral acceleration $G_{YO}$ presents a higher value than the actual lateral acceleration on a low $\mu$ road, it is judged whether or not the aimed lateral acceleration $G_{YO}$ is higher than such threshold value. Then, in case the aimed lateral acceleration $G_{YO}$ is higher than the threshold value, it is judged that the vehicle 68 is driving on a low $\mu$ road. It is to be noted that an actual lateral acceleration $G_Y$ which occurs on the vehicle 68 is calculated in accordance with the following expression (18) from a difference in circumferential speed between the rear wheels 64 and 65 and a car speed V:

$$G_Y = \frac{|V_{RL} - V_{RR}| \cdot V}{3.6^2 \cdot b \cdot g} \qquad (13)$$

where b is a tread between the rear wheels 64 and 65.

In case it is judged at step L3 that the aimed lateral acceleration $G_{YO}$ is higher than the threshold value $G_Y+0.05$ g, that is, the vehicle 68 is in a turning driving condition on a low $\mu$ road, the TCL 58 increments a low $\mu$ road timer (not shown) built therein. The counting time of the low $\mu$ road timer is, for example, 5 milliseconds. Then, before the counting operation of the low $\mu$ road timer is completed, the control sequence advances to step L6 in order to subsequently repeat, for each 15 milliseconds, the judging operation at step L3 depending upon the calculation of the aimed lateral acceleration $G_{YO}$ in accordance with the expression (9) and the calculation of the actual lateral acceleration $G_Y$ in accordance with the expression (13) given hereinabove.

In short, until after the period of 0.5 seconds elapses after starting of counting of the low $\mu$ road timer, the control sequence advances by way of steps L6 and L7 to step L8. At step L8, the TCL 58 outputs the maximum torque of the engine 11 as an aimed driving torque $T_{OL}$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

In case the condition wherein the aimed lateral acceleration $G_{YO}$ is higher than the threshold value $G_Y+0.05$ g does not continue for 0.5 seconds, the TCL 58 judges that the vehicle 68 is not driving on a low $\mu$ road, and the count value of the low $\mu$ road timer is cleared at step L9, whereafter the control sequence advances to steps L6 to L8.

On the contrary, if the condition wherein the aimed lateral acceleration $G_{YO}$ is higher than the threshold value $G_Y+0.05$ g continues for 0.5 seconds, then it is judged at step L10 whether or not the idling switch 57 is in an off state. In case it is judged that the idling switch 57 is in an on state and accordingly the accelerator pedal 26 is not in an operated condition by the driver, the control sequence does not advance to the turning control for a low $\mu$ road but advances to step L9 at which the count value of the low $\mu$ road timer is cleared, whereafter the control sequence advances to steps L6 to L8. The TCL 58 thus outputs the maximum torque of the engine 11 as an aimed driving torque $T_{OL}$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

In case it is judged at step L10 that the idling switch 57 is in an off state, that is, the accelerator pedal 26 is in an operated condition by the driver, the low $\mu$ road turning control flag $F_{CL}$ is set at step L11. Subsequently at step L6, it is judged whether or not the steering angle neutral position learning completion flag $F_H$ is in a set state, that is, the reliability of the steering angle $\delta$ detected by the steering angle sensor 70 is checked.

If it is judged at step L6 that the steering angle neutral position learning completion flag $F_H$ is in a set state, then it is judged again at step L7 whether or not the low $\mu$ road turning control flag $F_{CL}$ is in a set state. Here, in case the low $\mu$ road turning control flag $F_{CL}$ is in a set state at step L11, the aimed driving torque $T_{OL(n)}$ calculated precedently in accordance with the expression (12) given hereinabove is adopted as an aimed driving torque $T_{OL}$ for low $\mu$ road turning control at step L12.

In case it is judged at step L6 that the steering angle neutral position learning completion flag $F_H$ is not in a set state, since this means that the reliability of the steering angle $\delta$ is low, the control sequence advances to step L8 at which the TCL 58 outputs the maximum torque of the engine 11 as an aimed driving torque without adopting the aimed driving torque $T_{OL}$ calculated precedently at step L1 in accordance with the expression (12) given hereinabove. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

On the other hand, in case it is judged at step L2 that the low $\mu$ road turning control flag $F_{CL}$ is in a set state, the control sequence advances to step L13.

At steps L13 to L16, similarly as in the case of the high $\mu$ road turning control described hereinabove, it is judged whether or not the difference $\Delta T$ between the aimed driving torque $T_{OL(n)}$ calculated in the present control cycle and the aimed driving torque $T_{OL(n-1)}$ calculated in the preceding control cycle is greater than the allowable variation amount $T_K$, and whether the aimed driving torque $T_{OL(n)}$ of the present control cycle exhibits an increase or a decrease with respect to the aimed driving torque $T_{OL(n-1)}$ of the preceding control cycle, if the difference $\Delta T$ remains within the allowable driving torque $T_K$, the aimed driving torque $T_{OL(n)}$ calculated in the present control cycle is adopted as it is, but on the contrary if the difference $\Delta T$ exceeds the allowable variation amount $T_K$, then the aimed driving torque is restricted with the allowable variation amount $T_K$.

In short, when the aimed driving torque $T_{OL}$ is to be decreased, the aimed driving torque $T_{OL(n)}$ for the present control cycle is adopted at step L15 as $$T_{OL(n)} = T_{OL(n-1)} - T_K$$

but when the aimed driving torque $T_{OL}$ is to be increased, the aimed driving torque $T_{OL(n)}$ for the present control cycle is adopted at step L16 as $$T_{OL(n)} = T_{OL(n-1)} + T_K$$

After an aimed driving torque $T_{OL(n)}$ is set in such a manner as described above, the TCL 58 judges at step L17 whether or not the aimed driving torque $T_{OL(n)}$ thus set is higher than the requested driving torque $T_d$ requested by the driver.

Here, in case the low $\mu$ road turning control flag $F_{CL}$ is in a set state, the aimed driving torque $T_{OL(n)}$ is not higher than the requested driving torque $T_d$, and accordingly, the control sequence advances to step L9 at which the count value of the low $\mu$ road timer is cleared and then to steps L6 and L7 at which it is successively judged in this instance that the steering angle neutral position learning completion flag $F_H$ is in a set state and that the low $\mu$ road turning control flag $F_{CL}$ is in a set state. Consequently, the control sequence now advances to step L12 at which the aimed driving torque $T_{OL(n)}$ is determined as it is as a driving torque $T_{OL}$ for subsequent low $\mu$ road turning control.

On the other hand, also in case it is judged at step L17 that the aimed driving torque $T_{OL}$ is higher than the requested driving torque $T_d$ by the driver, if it is judged at subsequent step L18 that the steering shaft turning angle $\delta_H$ is smaller than, for example, 20 degrees, since this means that the vehicle 68 is continuing its turning driving, the turning control is continued as it is.

In case it is judged at step L17 that the aimed driving torque $T_{OL(n)}$ is higher than the requested driving torque $T_d$ by the driver and then it is judged at step L18 that the steering shaft turning angle $\delta_H$ is smaller than, for example, 20 degrees, since this means that the turning driving of the vehicle 68 has completed, the TCL 58 resets the low $\mu$ road turning control flag $F_{CL}$ at step L19.

After the low $\mu$ road turning control flag $F_{CL}$ is reset at step L19, since the low $\mu$ road timer need not continue its counting operation, the count value of the low $\mu$ road timer is cleared at step L9, whereafter the control sequence advances to steps L6 and L7. Here, since it is judged at step L7 that the low $\mu$ road turning control flag $F_{CL}$ is in a reset state, the control sequence advances to step L8 at which the TCL 58 outputs the maximum torque of the engine 11 as an aimed driving torque $T_{OL}$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

Figure 21:
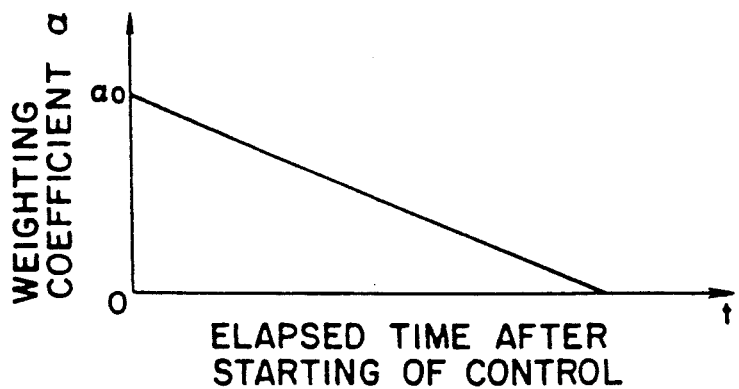
FIG. 21 is a graph illustrating a relationship between a time after starting of control and a weighting coefficient.
Figure 22:
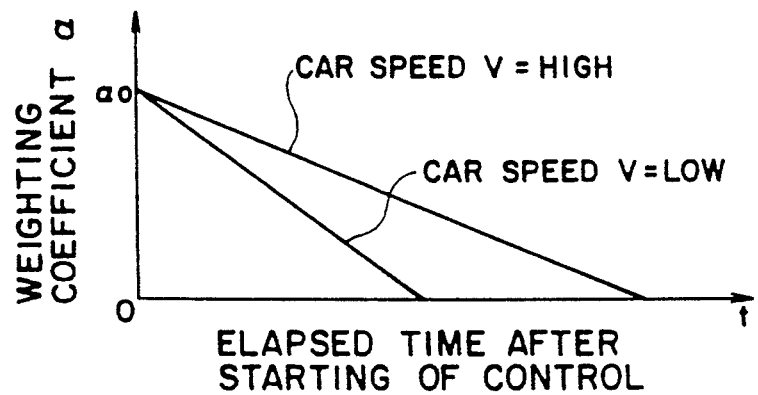
FIG. 22 is a graph illustrating a relationship between a car speed and a weighting coefficient.
Figure 23:
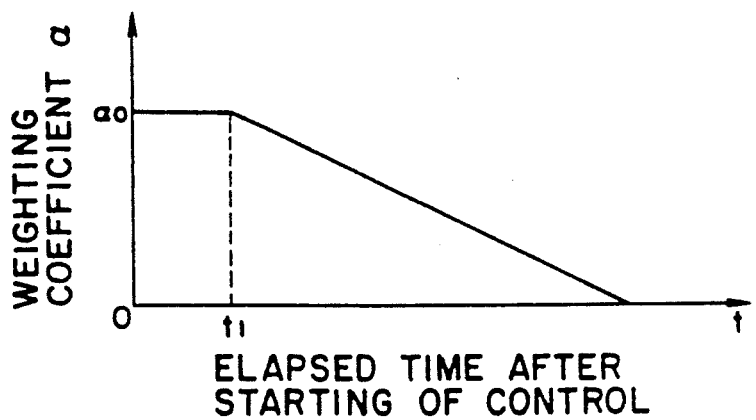
FIG. 23 is a graph illustrating another relationship between a time after starting of control and a weighting coefficient.

It is to be noted that a requested driving torque $T_d$ requested by a driver can naturally be ignored in order to simplify the procedure of turning control described above. In this instance, a reference driving torque $T_B$ which can be calculated in accordance with the expression (10) given hereinabove should be adopted as an aimed driving torque. Meanwhile, also where a requested driving torque $T_d$ by a driver is taken into consideration as in the case of the present embodiment, the weighting coefficient $\alpha$ need not be a fixed value, but either it may be gradually decreased as time passes after starting of control as seen in FIG. 21 or it may be gradually decreased in response to the speed of the vehicle while the adoption ratio of the requested driving torque $T_d$ of a driver is gradually increased as seen in FIG. 22. Similarly, it is possible to vary the coefficient $\alpha$ in such a manner as seen in FIG. 23 wherein it is kept at a fixed value for a predetermined period of time after starting of control, and after then, it is either decreased gradually as time passes or increased as the steering shaft turning amount $\delta_H$ increases so that the vehicle 68 may drive with safety particularly on a curved road which has a gradually decreasing radius of curvature.

It is to be noted that, while, in the calculating processing method described hereinabove, the aimed driving torques $T_{OH}$ and $T_{OL}$ are restricted, in calculation of them, with the allowable variation $T_K$ in order to prevent an acceleration or deceleration shock which may arise from a sudden variation in driving torque of the engine 11, such restriction may be effected for the aimed advancing direction acceleration $G_{XO}$. Where an allowable variation amount in this instance is represented by $G_K$, an aimed advancing direction acceleration $G_{XO(n)}$ for the n-th control cycle is given as follows:

In the case of $G_{XO(n)} - G_{XO(n-1)} > G_K$ $$G_{XO(n)} = G_{XO(n-1)} + G_K$$

In the case of $G_{XO(n)} - G_{XO(n-1)} < -G_K$ $$G_{XO(n)} = G_{XO(n-1)} - G_K$$

It is to be noted that, in case it is intended to restrict the variation of the aimed advancing direction acceleration $G_{XO}$ to 0.1 g per minute where the sampling time of the main timer is 15 milliseconds, the allowable variation amount $T_K$ should be $$G_k = 0.1 \cdot \Delta T$$

After an aimed driving torque $T_{OL}$ for low $\mu$ road turning control is calculated in this manner, the TCL 58 selects one of the three aimed driving torques $T_{OS}$, $T_{OH}$ and $T_{OL}$ as an optimum final aimed driving torque $T_O$ and outputs it to the ECU 54. In this instance, taking the driving safety of the vehicle 68 into consideration, that one of the three aimed driving driving torques $T_{OS}$, $T_{OH}$ and $T_{OL}$ which has the smallest value is outputted in priority. However, since normally the aimed driving torque $T_{OS}$ for slip control is always lower than the aimed driving torque $T_{OL}$ for low $\mu$ road turning control, the final aimed driving torque $T_O$ should be selected in the order of the aimed driving torque for slip control, for low $\mu$ road turning control and for high $\mu$ road turning control.

Figure 24:
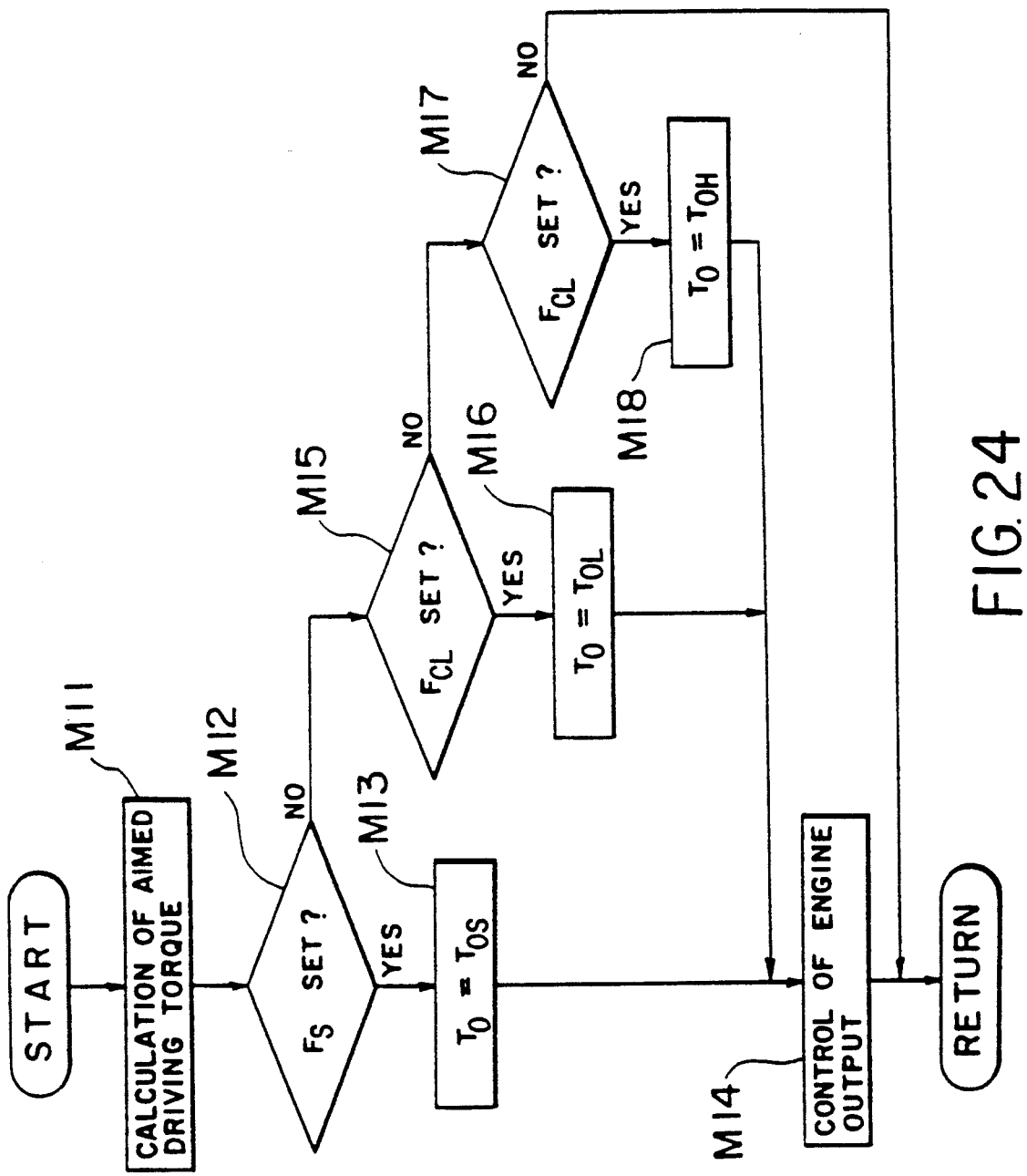
FIG. 24 is a flow chart illustrating an example of selecting operation of a final aimed driving torque in the flow chart of FIG. 4.

A flow of such processing is illustrated in FIG. 24. Referring to FIG. 24, such three aimed driving torques $T_{OS}$, $T_{OH}$ and $T_{OL}$ as described above are first calculated at step M11, and then at step M12, it is judged whether or not a slip control flag $F_S$ is in a set state.

If it is judged at step M12 that the slip control flag $F_S$ is in a set state, then the TCL 58 selects the aimed driving torque $T_{OS}$ for slip control as a final aimed driving torque $T_O$ and outputs it to the ECU 54 at step M13.

The ECU 54 has a map stored therein from which a throttle valve opening $\theta_T$ can be determined using an engine rotational speed $N_E$ and a driving torque of the engine 11 as parameters. Thus, the ECU 54 reads out, using the map, an aimed throttle opening $\theta_{TO}$ corresponding to a current engine rotational speed $N_E$ and the aimed driving torque $T_{OS}$. Subsequently, the ECU 54 finds out a deviation between an actual throttle opening $\theta_T$ received from the throttle opening sensor 56 and the aimed throttle opening $\theta_{TO}$, sets the duty ratio of the pair of torque controlling solenoid valves 46 and 51 to a value corresponding to the deviation and controls the torque controlling solenoid valves 46 and 51 in accordance with the duty ratio thus set so that suitable electric current may flow through the solenoids for the plungers 47 and 52 of them to decrease the actual throttle valve opening $\theta_T$ to the aimed value $\theta_{TO}$ by operation of the actuator 36.

In case it is judged at step M12 that the slip control flag $F_S$ is not in a set state, it is judged subsequently at step M15 whether or not the low $\mu$ road turning control flag $F_{CL}$ is in a set state.

In case it is judged at step M15 that the low $\mu$ road turning control flag $F_{CL}$ is in a set state, the aimed driving torque $T_{OL}$ for low $\mu$ road turning control is selected as a final aimed driving torque $T_O$ at step M16, whereafter the control sequence advances to step M14.

On the contrary, if it is judged at step M15 that the low $\mu$ road turning control flag $F_{CL}$ is not in a set state, then it is judged subsequently at step M17 whether or not the high $\mu$ road turning control flag $F_{CH}$ is in a set state.

Then, if it is judged at step M17 that the high $\mu$ road turning control flag $F_{CH}$ is in a set state, the aimed driving torque $T_{OH}$ for high $\mu$ road turning control is selected as a final aimed driving torque $T_O$ at step M18, whereafter the control sequence advances to step M14.

On the other hand, in case it is judged at step M17 that the high $\mu$ road turning control flag $F_{CH}$ is not in a set state, the TCL 58 outputs the maximum torque of the engine 11 as a final aimed driving torque $T_O$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver. In this instance, in the present embodiment, the duty ratio of the pair of torque controlling solenoid valves 46 and 51 is not reduced to zero percent unconditionally, but the ECU 54 first compares the actual accelerator valve opening $\theta_A$ with the maximum throttle valve opening limit value and determines, in case the accelerator valve opening $\theta_A$ exceeds the maximum throttle valve opening limit value, the duty ratio of the pair of torque controlling solenoid valves 46 and 51 so that the throttle valve opening $\theta_A$ may be equal to the maximum throttle valve opening limit value, and then drives the plungers 47 and 52 of them in accordance with such duty ratio. The maximum throttle valve opening limit value is a function of the engine rotational speed $N_E$ and is set such that, when the engine rotational speed $N_E$ is equal to or higher than a certain value (for example, 2.000 rpm), it remains a throttle valve opening equal to or around that in the fully closed condition, but when the engine rotational speed $N_E$ is lower than the certain value, it gradually decreases to an opening of several tens percent as the engine rotational speed $N_E$ decreases.

The reason why the throttle opening $\theta_T$ is restricted in this manner is that it is intended to assure a high responsibility of control when the TCL 58 judges that it is necessary to reduce the driving torque of the engine 11. In particular, the current designing policy has such a tendency that the bore diameter (air passageway sectional area) of the throttle body 16 is made very large in order to assure a high acceleration performance and/or maximum output power of the vehicle 68, and when the engine 11 is in a low rotational speed region, the intake air amount is saturated with a throttle valve opening $\theta_T$ of several tens percent or so. Thus, where the throttle valve opening $\theta_T$ is restricted to a predetermined level rather than set to a value equal to or around the value thereof in the fully open condition of the throttle valve in accordance with an amount of operation of the accelerator pedal 26, the deviation of the actual throttle valve opening $\theta_T$ from the aimed throttle opening $\theta_{TO}$ when a driving torque reducing instruction is received is smaller, and accordingly, the aimed throttle valve opening $\theta_{TO}$ can be reached more quickly.

While aimed driving torques for two kinds of turning controls for a high $\mu$ road and a low $\mu$ road are calculated in the embodiment described hereinabove, an aimed driving torque for turning control for a medium road between a high $\mu$ road and a low $\mu$ road may additionally be calculated so that a final aimed driving torque may be selected from among those three aimed driving torques.

It is also possible to calculate, on the contrary, an aimed driving torque for only one kind of turning control and select, since, during slipping control, normally the aimed driving torque $T_{OS}$ for slip control is always lower than the aimed driving torque $T_{OC}$ for turning control, the aimed driving torque $T_{OS}$ for slip control preferentially to the aimed driving torque $T_{OC}$ for turning control.

Figure 25:
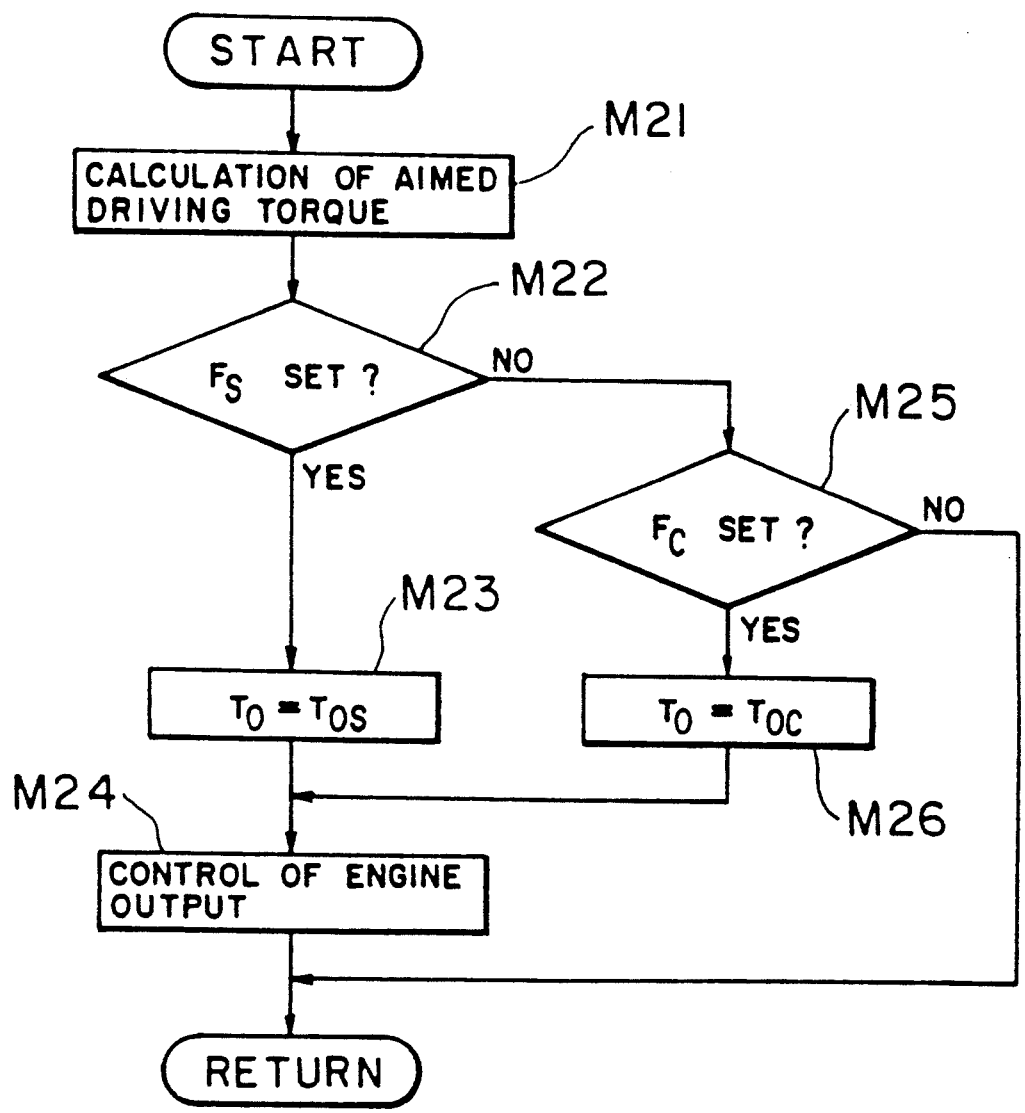
FIG. 25 is a flow chart illustrating another example of selecting operation of a final aimed driving torque.

A flow of such processing is shown in FIG. 25. Referring to FIG. 25, an aimed driving torque $T_{OS}$ for slip control and another aimed driving torque $T_{OC}$ for turning control are calculated at step M21 in a similar manner as described hereinabove. Then at step M22, it is judged whether or not the slip control flag $F_S$ is in a set state.

If it is judged at step M22 that the slip control flag $F_S$ is in a set state, then the aimed driving torque $T_{OS}$ for slip control is selected as a final aimed driving torque $T_O$ at step M23. Then at step M24, the ECU 54 reads out an aimed throttle valve opening $\theta_{TO}$ corresponding to a current engine rotational speed $N_E$ and the aimed driving torque $T_{OS}$ from a map stored in the ECU 54, calculates a deviation from the aimed throttle valve opening $\theta_{TO}$ of an actual throttle valve opening $\theta_T$ received from the throttle opening sensor 56, sets the duty ratio of the pair of torque controlling solenoid valves 46 and 51 to a value corresponding to the deviation, and controls the torque controlling solenoid valves 46 and 51 in accordance with the duty ratio thus set so that a suitable electric current may flow through the solenoids for the plungers 47 and 52 of them to lower the actual throttle valve opening $\theta_T$ to the aimed throttle valve opening $\theta_{TO}$ by operation of the actuator 36.

In case it is judged at step M22 that the slip control flag $F_S$ is not in a set state, it is judged subsequently at step M25 whether or not a turning control flag $F_C$ is in a set state.

If it is judged at step M25 that the turning control flag $F_C$ is in a set state, then the aimed driving torque $T_{OC}$ for turning control is selected as a final aimed driving torque $T_O$ at step M26, whereafter the control sequence advances to step M24.

On the contrary, in case it is judged at step M25 that the turning control flag $F_C$ is not in a set state, the TCL 58 outputs the maximum driving torque of the engine 11 as a final aimed driving torque $T_O$. Consequently, the ECU 54 lowers the duty ratio of the torque controlling solenoid valves 46 and 51 to the zero percent side, and as a result, the engine 11 generates a driving torque corresponding to an amount of operation of the accelerator pedal 26 by the driver.

What is claimed is:

1. An engine torque controlling system for a vehicle, said system comprising:
    engine torque adjusting means for adjusting the engine torque independently of operation by a driver,
    first engine torque setting means for setting a first aimed engine torque in response to a magnitude of lateral acceleration applied to said vehicle during turning of said vehicle,
    second engine torque setting means for setting a second aimed engine torque in response to an amount of slip of a driving wheel of said vehicle,
    selector means for selecting and outputting said second aimed engine torque whenever said first aimed engine torque has been set by said first engine torque setting means and said second aimed engine torque has been set by said second engine torque setting means regardless of the values of said first and second aimed engine torques, and
    engine torque controlling means for controlling said engine torque adjusting means so that the torque of said engine becomes equal to the aimed torque engine torque selected by said selector means.

2. An engine torque controlling system as claimed in claim 1, wherein said first engine torque setting means includes aimed lateral acceleration setting means for setting, as a predicted value of the lateral acceleration applied to the vehicle, an aimed lateral acceleration in response to a steering angle and a speed of said vehicle, aimed advance direction acceleration setting means for setting an aimed advance direction acceleration corresponding to the aimed lateral acceleration set by said aimed lateral acceleration setting means, and aimed engine torque determining means for determining said first aimed engine torque in response to the aimed advance direction acceleration set by said aimed advance direction acceleration setting means.

3. An engine torque controlling system as claimed in claim 1, wherein said second engine torque setting means includes reference engine torque setting means for setting a reference engine torque in response to an advance direction acceleration of said vehicle, and engine torque correcting means for correcting the reference engine torque set by said reference engine torque setting means based on a slip of said driving wheel to set said second aimed engine torque.

4. An engine torque controlling system as claimed in claim 1, wherein said first engine torque setting means sets as the first aimed engine torque an aimed engine torque for a road surface of a low coefficient of friction and a third aimed engine torque for a road surface of a coefficient of friction higher than the coefficient of friction of the road surface corresponding to the first aimed engine torque; and
    wherein said selector means selects and outputs said second aimed engine torque when said first aimed engine torque and said third aimed engine torque have been set by said first engine torque setting means and said second aimed engine torque has been set by said second engine torque setting means but when said second aimed engine torque has not been set, selects one of said first aimed engine torque and said third aimed engine torque on the bases of a coefficient of friction of a road surface and outputs the same.

5. A method of controlling the engine torque of a vehicle, said method comprising the steps of:
- adjusting the engine torque independently of operation by a driver,
- setting a first aimed engine torque in response to a magnitude of lateral acceleration applied to said vehicle during turning of said vehicle,
- setting a second aimed engine torque in response to an amount of slip of a driving wheel of said vehicle,
- selecting and outputting said second aimed engine torque whenever said first aimed engine torque has been set and said second aimed engine torque has been set, regardless of the values of said first and second aimed engine torques,
- wherein said engine torque is adjusted so that the torque of said engine becomes equal to the aimed torque engine torque selected.

6. A method as claimed in claim 5, further comprising the step of setting a third aimed engine torque, wherein said first aimed engine torque is set as an aimed engine torque for a road surface of a low coefficient of friction and wherein said third aimed engine torque is set for a road surface of a coefficient of friction higher than the coefficient of friction of the road surface corresponding to the first aimed engine torque; and
- wherein said second aimed engine torque is selected when said first aimed engine torque and said third aimed engine torque have been set and said second aimed engine torque has been set but when said second aimed engine torque has not been set, one of said first aimed engine torque and said third aimed engine torque is selected on the basis of a coefficient of friction of a road surface and is outputted.

7. A method as claimed in claim 5, further comprising the steps of:
- setting an aimed lateral acceleration in response to a steering angle and a speed of the vehicle, said aimed lateral acceleration being a predicted value of the lateral acceleration applied to the vehicle;
- setting an aimed advance direction acceleration corresponding to the set aimed lateral acceleration; and
- determining the first aimed engine torque in response to the set aimed advance direction acceleration.

* * * * *